United States Patent
Yamamoto

(10) Patent No.: US 8,088,035 B2
(45) Date of Patent: Jan. 3, 2012

(54) VEHICLE AND CONTROL METHOD OF VEHICLE

(75) Inventor: Masaya Yamamoto, Kasugai (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 308 days.

(21) Appl. No.: 12/531,574

(22) PCT Filed: Mar. 31, 2008

(86) PCT No.: PCT/JP2008/056346
§ 371 (c)(1),
(2), (4) Date: Sep. 16, 2009

(87) PCT Pub. No.: WO2008/120779
PCT Pub. Date: Oct. 9, 2008

(65) Prior Publication Data
US 2010/0087288 A1 Apr. 8, 2010

(30) Foreign Application Priority Data
Mar. 30, 2007 (JP) .................................. 2007-091136

(51) Int. Cl.
*B60K 1/02* (2006.01)

(52) U.S. Cl. .......................................... 477/3; 477/101

(58) Field of Classification Search .............. 477/3, 101, 477/103, 105, 115
See application file for complete search history.

(56) References Cited

U.S. PATENT DOCUMENTS

| 5,842,534 | A | 12/1998 | Frank | |
|---|---|---|---|---|
| 6,356,042 | B1 * | 3/2002 | Kahlon et al. | 318/400.1 |
| 7,021,409 | B2 * | 4/2006 | Tamor | 180/65.25 |
| 7,857,082 | B2 * | 12/2010 | Gray, Jr. | 180/65.28 |
| 2004/0006414 | A1 | 1/2004 | Suzuki | |

FOREIGN PATENT DOCUMENTS

| EP | 1 452 374 A2 | 9/2004 |
|---|---|---|
| JP | 2001-173479 A | 6/2001 |

(Continued)

OTHER PUBLICATIONS

Office Action issued Nov. 11, 2008 in Japanese priority application No. 2007-091136 and verified English translation thereof.

(Continued)

*Primary Examiner* — Justin Holmes
(74) *Attorney, Agent, or Firm* — Kenyon & Kenyon LLP

(57) ABSTRACT

The intermittence prohibition vehicle speed Vpr is set to the smallest of the standard intermittence prohibition vehicle speed Vpr1 set according to the input limit Win of the battery, the sequential intermittence prohibition vehicle speed Vpr2 set for the sequential gearshift position, and the power mode intermittence prohibition vehicle speed Vpr3 set for the power mode (S400 to S480). When the vehicle speed V is less than the intermittence prohibition vehicle speed Vpr, the hybrid vehicle is driven with output of the torque demand Tr* to the driveshaft within the range of the input limit Win or the output limit Wout of the battery with intermittent operation of the engine. When the vehicle speed V is more than or equal to the intermittence prohibition vehicle speed Vpr, the hybrid vehicle is driven with output of the torque demand Tr* to the driveshaft within the range of the input limit Win or the output limit Wout of the battery in prohibition of the intermittent operation of the engine.

9 Claims, 11 Drawing Sheets

FOREIGN PATENT DOCUMENTS

| | | |
|---|---|---|
| JP | 2002-337573 A | 11/2002 |
| JP | 2004-357459 A | 12/2004 |
| JP | 2005-039880 A | 2/2005 |
| JP | 2005-231409 A | 9/2005 |
| JP | 2006-007877 A | 1/2006 |
| JP | 2006-170128 A | 6/2006 |
| JP | 2006-170218 A | 6/2006 |
| JP | 2007-131103 A | 5/2007 |
| WO | 2006/0106894 A1 | 10/2006 |

OTHER PUBLICATIONS

Extended European Search Report dated Mar. 4, 2011.

* cited by examiner

VEHICLE AND CONTROL METHOD OF VEHICLE

This is a 371 national phase application of PCT/JP2008/056346 filed 31 Mar. 2008, claiming priority to Japanese Patent Application No. JP 2007-091136 filed 30 Mar. 2007, the contents of which are incorporated herein by reference.

TECHNICAL FIELD

The present invention relates to a vehicle and a control method of the vehicle.

BACKGROUND ART

In one proposed hybrid vehicle having an engine and a motor, a threshold value of the vehicle speed is set based on the temperature of a battery which supplies electric power to the motor and the output value of the battery actually outputting electric power. The threshold value represents a boundary of a region to prohibit operation stop of the engine (see, for example, Patent Document 1). This vehicle is intended for protecting the battery by setting the threshold value of the vehicle speed smaller for the high temperature of the battery while setting the threshold value of the vehicle speed greater for the large actual output from the battery, and by prohibiting the operation stop of the engine when the vehicle speed is greater than the threshold value.

Patent Document 1: Japanese Patent Laid-Open No. 2006-170128

DISCLOSURE OF THE INVENTION

The battery state is not only determined by the battery temperature and the actual output from the battery, but also highly dependent on the battery state of charge SOC defined as an index of the amount of electric power dischargeable from the battery. The input and output limits of the battery are especially an important factor in controlling the battery. The input and output limits represent an allowable charging electric power to be charged in the battery and an allowable discharging electric power to be discharged from the battery in accordance with the battery temperature and the battery state of charge SOC.

In the vehicle of the invention and the control method of the vehicle, the object of the invention is to effectively prevent an accumulator unit such as a secondary battery from being charged with excessive electric power. The vehicle has an internal combustion engine outputting power required for driving the vehicle and a motor, and is driven with an intermittent operation of the internal combustion engine. In the vehicle of the invention and the control method of the vehicle, the object of the invention is also to effectively prevent sudden change of driving power possible to occur at the start of the internal combustion engine.

In order to attain at least part of the above objects and the other related objects, the vehicle of the invention and the control method of the vehicle have the configurations discussed below.

According to one aspect, the present invention is directed to a vehicle. The vehicle includes: an internal combustion engine; an electric power-mechanical power input output assembly connected with a driveshaft linked to an axle of the vehicle and with an output shaft of the internal combustion engine in such a manner as to be rotatable independently of the driveshaft and configured to input and output power to and from the driveshaft and the output shaft through input and output of electric power and mechanical power; a motor capable of outputting power to the driveshaft; an accumulator configured to transmit electric power to and from the electric power-mechanical power input output assembly and the motor; an input output limits setting module that sets input and output limits of the accumulator as maximum allowable electric powers to be charged in and discharged from the accumulator, according to a state of the accumulator; an intermittent operation prohibition vehicle speed setting module that sets an intermittent operation prohibition vehicle speed for prohibiting an intermittent operation of the internal combustion engine, according to the set input limit of the accumulator; a vehicle speed detector that detects a vehicle speed; a driving power demand setting module that sets a driving power demand required for driving the vehicle; and a controller configured to, when the detected vehicle speed is less than the set intermittent operation prohibition vehicle speed, controls the internal combustion engine, the electric power-mechanical power input output assembly, and the motor so that the vehicle is driven with a driving power corresponding to the set driving power demand in a range defined by the set input and output limits of the accumulator with the intermittent operation of the internal combustion engine, when the detected vehicle speed is more than or equal to the set intermittent operation prohibition vehicle speed, the controller controlling the internal combustion engine, the electric power-mechanical power input output assembly, and the motor so that the vehicle is driven with the driving power corresponding to the set driving power in the range defined by the set input and output limits of the accumulator with a continuous operation of the internal combustion engine.

The vehicle according to this aspect of the invention, sets an intermittent operation prohibition vehicle speed for prohibiting an intermittent operation of the internal combustion engine according to an input limit of the accumulator, the input limit and an output limit of the accumulator settable according to a state of the accumulator as maximum allowable electric powers to be charged in and discharged from the accumulator. The vehicle of the invention controls, when a vehicle speed is less than the set intermittent operation prohibition vehicle speed, the internal combustion engine, the electric power-mechanical power input output assembly, and the motor so that the vehicle is driven with a driving power corresponding to a driving power demand required for driving the vehicle in a range defined by the input and output limits of the accumulator with the intermittent operation of the internal combustion engine. The vehicle of the invention controls, when the vehicle speed is more than or equal to the set intermittent operation prohibition vehicle speed, the internal combustion engine, the electric power-mechanical power input output assembly, and the motor so that the vehicle is driven with the driving power corresponding to the driving power in the range defined by the input and output limits of the accumulator with a continuous operation of the internal combustion engine. Namely, the intermittent operation of the internal combustion is permitted when the vehicle speed is less than the intermittent operation prohibition vehicle speed, and the intermittent operation of the internal combustion engine is prohibited when the vehicle speed is more than or equal to the intermittent operation prohibition vehicle speed. The intermittent operation prohibition vehicle speed is set according to the input limit of the accumulator. This arrangement enables to start up the internal combustion engine without charging the accumulator with excessive electric power when the vehicle speed is less than the intermittent operation prohibition vehicle speed. This arrangement prevents operation stop of the internal combustion engine when the vehicle speed is more than or equal to the intermittent operation prohibition vehicle speed and therefore enables to prevent the accumulator from being charged with excessive electric power possible to occur at the start of the internal combustion engine. This arrangement, furthermore, effectively prevents sudden change of driving power applied to the vehicle and possible to occur under restriction of driving the motor while preventing the accumulator from being charged with the excessive electric power at the start of the internal combustion engine.

In one preferable application of the vehicle of the invention, the intermittent operation prohibition vehicle speed setting module sets the intermittent operation prohibition vehicle speed having a tendency to be lower against severer limitation of the input limit of the accumulator. This arrangement more effectively prevents the accumulator from being charged with excessive electric power possible to occur at the start of the internal combustion engine and also prevents sudden change of driving power possible to occur at the start of the internal combustion engine.

In another preferable application of the vehicle of the invention, the vehicle further includes: a control mode setting module that sets at least one vehicle control mode of multiple vehicle control modes where output powers corresponding to driver's operation are different. In this embodiment, the intermittent operation prohibition vehicle speed setting module sets the intermittent operation prohibition vehicle speed, according to the set vehicle control mode, and the controller controls the internal combustion engine, the electric power-mechanical power input output assembly, and the motor, according to the set vehicle control mode. In this arrangement, the intermittent operation of the internal combustion engine is permitted or prohibited using the intermittent operation prohibition vehicle speed corresponding to the set vehicle control mode. This arrangement enables the vehicle to be driven according to the set vehicle control mode.

In the vehicle of the application setting the intermittent operation prohibition vehicle speed according to the vehicle control mode, the controller, when more than one vehicle control modes are set by the control mode setting module, may specify the smallest of the set intermittent operation prohibition vehicle speeds according to the set vehicle control modes as the intermittent operation prohibition vehicle speed. This arrangement more effectively prevents, in the set respective vehicle control modes, the accumulator from being charged with excessive electric power possible to occur at the start of the internal combustion engine and prevents sudden change of driving power possible to occur at the start of the internal combustion engine.

In the vehicle of the application setting the intermittent operation prohibition vehicle speed according to the vehicle control mode, the multiple vehicle control modes may include an ordinary mode which enhances both fuel efficiency and responsiveness of output power and a power mode which gives higher priority to the responsiveness of output of power. The intermittent operation prohibition vehicle speed setting module, when the ordinary mode is set by the control mode setting module, may set the intermittent operation prohibition vehicle speed according to the input limit of the accumulator using a first relationship. The intermittent operation prohibition vehicle speed setting module, when the power mode is set by the control mode setting module, may set the intermittent operation prohibition vehicle speed according to the input limit of the accumulator using a second relationship where the intermittent operation prohibition vehicle speed is defined to be greater than the one defined in the first relationship. This arrangement more effectively prevents, according to the ordinary mode and the power mode, the accumulator from being charged with excessive electric power possible to occur at the start of the internal combustion engine and prevents sudden change of driving power possible to occur at the start of the internal combustion engine.

In the vehicle of the application setting the intermittent operation prohibition vehicle speed according to the vehicle control mode, the multiple vehicle control modes may include a sequential gearshift mode where braking force applied to the vehicle is changed according to driver's gearshift operation in a state of accelerator-off and brake-off.

The intermittent operation prohibition vehicle speed setting module, when the sequential gearshift mode is set by the control mode setting module, may set the intermittent operation prohibition vehicle speed according to the driver's gearshift operation and the input limit of the accumulator. This arrangement more effectively prevents, according to the driver's gearshift operation in the sequential gearshift mode, the accumulator from being charged with excessive electric power possible to occur at the start of the internal combustion engine and prevents sudden change of driving power possible to occur at the start of the internal combustion engine. In this case, the intermittent operation prohibition vehicle speed setting module, when the sequential gearshift mode is set by the control mode setting module, may set the intermittent operation prohibition vehicle speed having a tendency to be lower against greater braking force applied to the vehicle. In this case, the intermittent operation prohibition vehicle speed setting module, when the sequential gearshift mode is set by the control mode setting module, may set the intermittent operation prohibition vehicle speed using multiple relationships that are different according to the driver's gearshift operation.

In one preferable embodiment of the vehicle of the invention, the electric power-mechanical power input and output assembly includes: a generator configured to input and output power; and a three shaft-type power input output structure connected to three shafts, the driveshaft, the output shaft of the internal combustion engine, and a rotating shaft of the generator, and designed to input and output power to residual shaft based on powers input from and output to any two shafts among the three shafts.

According to another aspect, the present invention is directed to a control method of a vehicle. The vehicle includes: an internal combustion engine; an electric power-mechanical power input output assembly connected with a driveshaft linked to an axle of the vehicle and with an output shaft of the internal combustion engine in such a manner as to be rotatable independently of the driveshaft and configured to input and output power to and from the driveshaft and the output shaft through input and output of electric power and mechanical power; a motor capable of outputting power to the driveshaft; an accumulator configured to transmit electric power to and from the electric power-mechanical power input output assembly and the motor. The control method sets an intermittent operation prohibition vehicle speed for prohibiting an intermittent operation of the internal combustion engine according to an input limit of the accumulator, the input limit and an output limit of the accumulator settable according to a state of the accumulator as maximum allowable electric powers to be charged in and discharged from the accumulator. And the control method controls, when a vehicle speed is less than the set intermittent operation prohibition vehicle speed, the internal combustion engine, the electric power-mechanical power input output assembly, and the motor so that the vehicle is driven with a driving power corresponding to a driving power demand required for driving the vehicle in a range defined by the input and output limits of the accumulator with the intermittent operation of the internal combustion engine, while controlling, when the vehicle speed is more than or equal to the set intermittent operation prohibition vehicle speed, the internal combustion engine, the electric power-mechanical power input output assembly, and the motor so that the vehicle is driven with the driving power corresponding to the driving power in the range defined by the input and output limits of the accumulator with a continuous operation of the internal combustion engine.

The control method of the vehicle according to this aspect of the invention, sets an intermittent operation prohibition vehicle speed for prohibiting an intermittent operation of the internal combustion engine according to an input limit of the accumulator, the input limit and an output limit of the accumulator settable according to a state of the accumulator as maximum allowable electric powers to be charged in and discharged from the accumulator. The vehicle of the invention controls, when a vehicle speed is less than the set intermittent operation prohibition vehicle speed, the internal combustion engine, the electric power-mechanical power input output assembly, and the motor so that the vehicle is driven with a driving power corresponding to a driving power demand required for driving the vehicle in a range defined by the input and output limits of the accumulator with the intermittent operation of the internal combustion engine. The vehicle of the invention controls, when the vehicle speed is more than or equal to the set intermittent operation prohibition vehicle speed, the internal combustion engine, the electric power-mechanical power input output assembly, and the motor so that the vehicle is driven with the driving power corresponding to the driving power in the range defined by the input and output limits of the accumulator with a continuous operation of the internal combustion engine. Namely, the intermittent operation of the internal combustion is permitted when the vehicle speed is less than the intermittent operation prohibition vehicle speed, and the intermittent operation of the internal combustion engine is prohibited when the vehicle speed is more than or equal to the intermittent operation prohibition vehicle speed. The intermittent operation prohibition vehicle speed is set according to the input limit of the accumulator. This arrangement enables to start up the internal combustion engine without charging the accumulator with excessive electric power when the vehicle speed is less than the intermittent operation prohibition vehicle speed. This arrangement prevents operation stop of the internal combustion engine and therefore enables to prevent the accumulator from being charged with excessive electric power possible to occur at the start of the internal combustion engine. This arrangement, furthermore, effectively prevents sudden change of driving power applied to the vehicle and possible to occur under restriction of driving the motor while preventing the accumulator from being charged with the excessive electric power at the start of the internal combustion engine.

BEST MODES OF CARRYING OUT THE INVENTION

Figure 1:
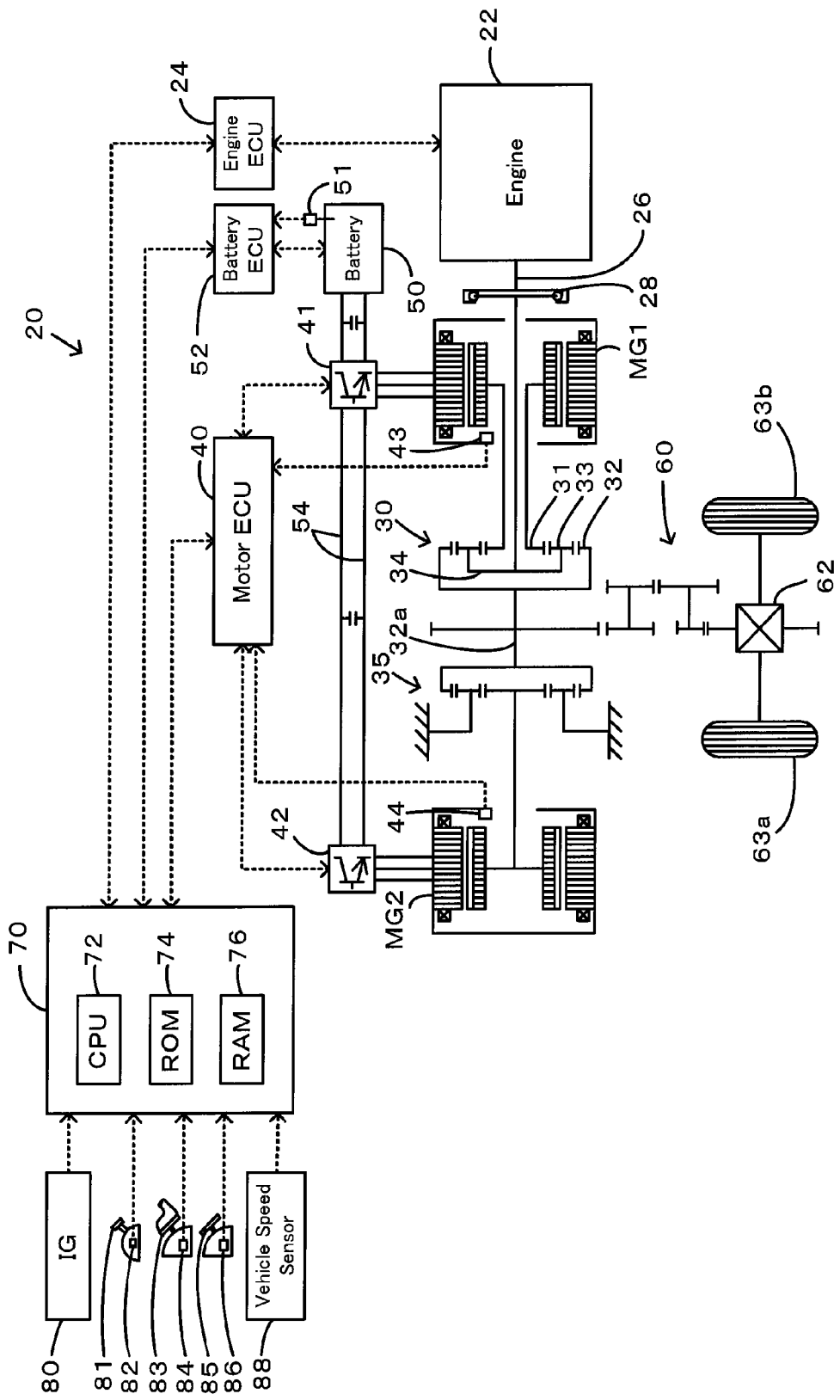
FIG. 1 schematically illustrates the configuration of a hybrid vehicle 20 in one embodiment of the invention.

One mode of carrying out the invention is discussed below as a preferred embodiment. FIG. 1 schematically illustrates the configuration of a hybrid vehicle 20 in one embodiment of the invention. As illustrated, the hybrid vehicle 20 of the embodiment includes the engine 22, a three shaft-type power distribution integration mechanism 30 connected via a damper 28 to a crankshaft 26 or an output shaft of the engine 22, a motor MG1 connected to the power distribution integration mechanism 30 and designed to have power generation capability, a reduction gear 35 attached to a ring gear shaft 32a or a driveshaft linked with the power distribution integration mechanism 30, a motor MG2 connected to the reduction gear 35, and a hybrid electronic control unit 70 configured to control the operations of the whole hybrid vehicle 20.

Figure 2:
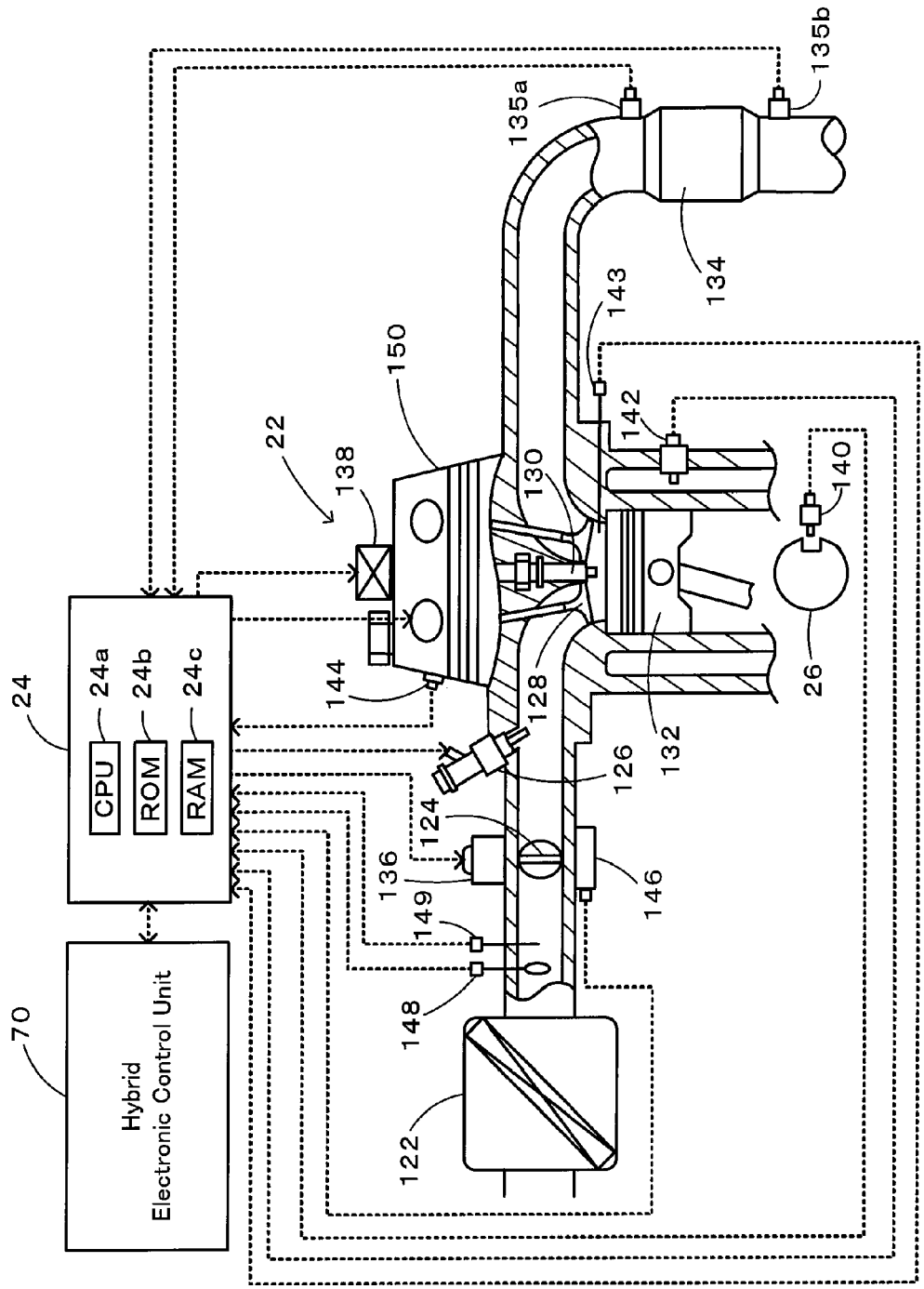
FIG. 2 is a schematic view showing the structure of an engine 22.

The engine 22 is an internal combustion engine that consumes a hydrocarbon fuel, such as gasoline or light oil, to output power. As shown in FIG. 2, the air cleaned by an air cleaner 122 and taken into an air intake conduit via a throttle valve 124 is mixed with the atomized fuel injected from a fuel injection valve 126 to the air-fuel mixture. The air-fuel mixture is introduced into a combustion chamber 166 by means of an intake valve 128. The introduced air-fuel mixture is ignited with spark made by a spark plug 130 to be explosively combusted. The reciprocating motions of a piston 132 pressed down by the combustion energy are converted into rotational motions of the crankshaft 26. The exhaust from the engine 22 goes through a catalytic converter (three-way catalyst) 134 to convert toxic components included in the exhaust, that is, carbon monoxide (CO), hydrocarbons (HC), and nitrogen oxides (NOx), into harmless components, and is discharged to the outside air.

The engine 22 is under control of an engine electronic control unit (hereafter referred to as engine ECU) 24. The engine ECU 24 is constructed as a microprocessor including a CPU 24$a$, a ROM 24$b$ configured to store processing programs, a RAM 24$c$ configured to temporarily store data, input and output ports (not shown), and a communication port (not shown). The engine ECU 24 receives, via its input port, signals from various sensors designed to measure and detect the operating conditions of the engine 22. The signals input into the engine ECU 24 include a crank position from a crank position sensor 140 detected as the rotational position of the crankshaft 26, a cooling water temperature from a water temperature sensor 142 measured as the temperature of cooling water in the engine 22, an in-cylinder pressure Pin from a pressure sensor 143 located inside the combustion chamber, cam positions from a cam position sensor 144 detected as the rotational positions of camshafts driven to open and close the intake valve 128 and an exhaust valve for gas intake and exhaust into and from the combustion chamber, a throttle position from a throttle valve position sensor 146 detected as the position of the throttle valve 124, an air flow meter signal from an air flow meter 148 located in an air intake conduit, an intake air temperature from a temperature sensor 149 located in the air intake conduit, an air fuel ratio from an air-fuel ratio sensor 135$a$, and an oxygen signal from an oxygen sensor 135$b$. The engine ECU 24 outputs, via its output port, diverse control signals and driving signals to drive and control the engine 22. The signals output from the engine ECU 24 include driving signals to the fuel injection valve 126, driving signals to a throttle valve motor 136 driven to regulate the position of the throttle valve 124, control signals to an ignition coil 138 integrated with an igniter, and control signals to a variable valve timing mechanism 150 to vary the open and close timings of the intake valve 128. The engine ECU 24 establishes communication with the hybrid electronic control unit 70 to drive and control the engine 22 in response to control signals received from the hybrid electronic control unit 70 and to output data regarding the operating conditions of the engine 22 to the hybrid electronic control unit 70 according to the requirements. The engine ECU 24 also performs an arithmetic operation to compute a rotation speed of the crankshaft 26 or a rotation speed Ne of the engine 22 from the crank position input from the crank position sensor 140.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32$a$. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63$a$ and 63$b$ via the gear mechanism 60, and the differential gear 62 from ring gear shaft 32$a$.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements. The motor ECU 40 also performs arithmetic operations to compute rotation speeds Nm1 and Nm2 of the motors MG1 and MG2 from the output signals of the rotational position detection sensors 43 and 44.

Figure 3:
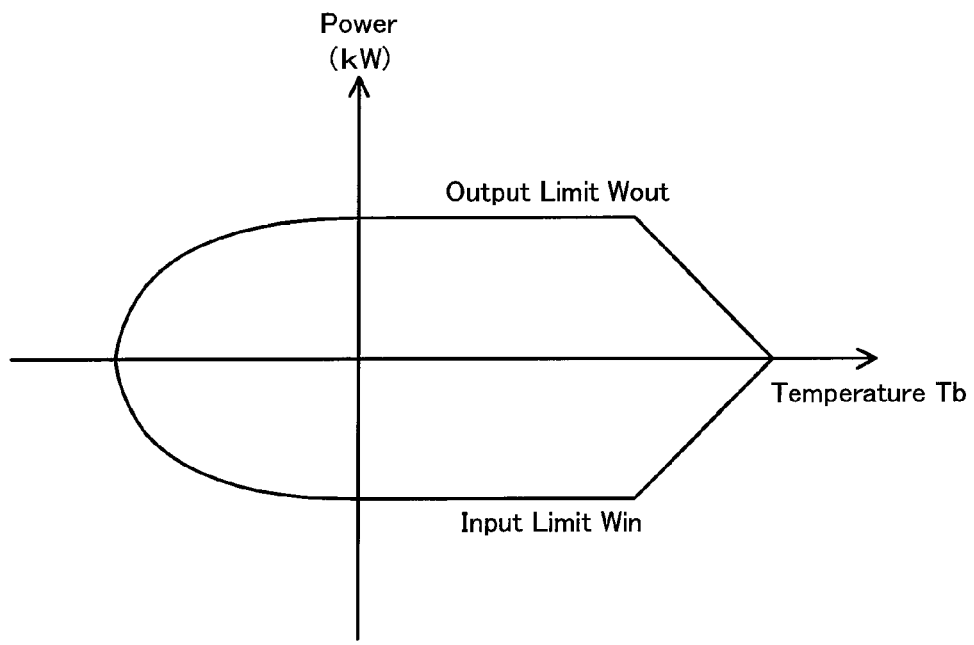
FIG. 3 shows variations of an input limit Win and an output limit Wout against battery temperature Tb of a battery 50.
Figure 4:
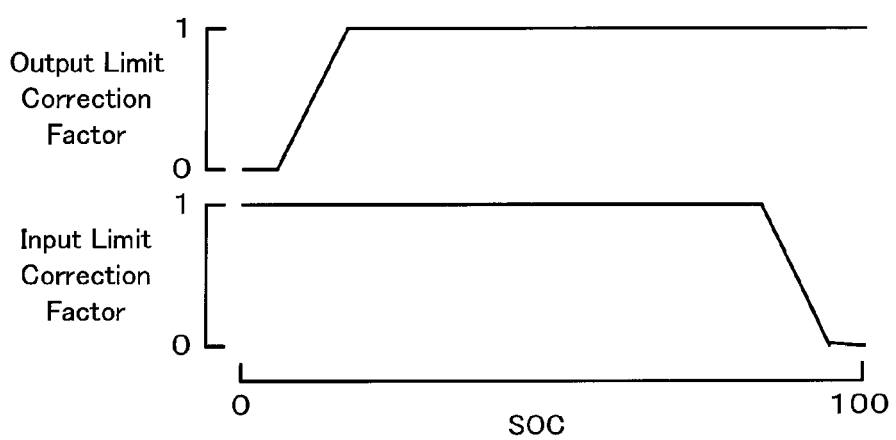
FIG. 4 shows variations of an input limit correction factor and an output limit correction factor against state of charge SOC of the battery 50.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 also performs various arithmetic operations for management and control of the battery 50. A remaining charge or state of charge (SOC) of the battery 50 is calculated from an integrated value of the charge-discharge current measured by the current sensor. An input limit Win as an allowable charging electric power to be charged in the battery 50 and an output limit Wout as an allowable discharging electric power to be discharged from the battery 50 are set corresponding to the calculated state of charge (SOC) and the battery temperature Tb. A concrete procedure of setting the input and output limits Win and Wout of the battery 50 sets base values of the input limit Win and the output limit Wout corresponding to the battery temperature Tb, specifies an input limit correction factor and an output limit correction factor corresponding to the state of charge (SOC) of the battery 50, and multiplies the base values of the input limit Win and the output limit Wout by the specified input limit correction factor and output limit correction factor to determine the input limit Win and the output limit Wout of the battery 50. FIG. 3 shows variations of the input limit Win and the output limit Wout against the battery temperature Tb of the battery 50. FIG. 4 shows variations of the input limit correction factor and the output limit correction factor against the state of charge (SOC) of the battery 50.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, a vehicle speed V from a vehicle speed sensor 88, and a power mode switch signal PSW from a power mode switch 89 for giving higher priority to output of power. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

In the hybrid vehicle 20 of the embodiment, a sequential gearshift position (S position), an upshift instruction position, and a downshift instruction position, as well as a parking position (P position) for parking, a reverse position (R position) for reverse driving, a neutral position (N position), and a drive position (D position) for general forward driving are provided as the gearshift position SP of the gearshift lever 81. On selection of the D position as the gearshift position SP, the hybrid vehicle 20 of the embodiment drives and controls operation of the engine 22 to enable its efficient operation with relatively higher responsiveness of output power. On selection of the S position as the gearshift position SP, a ratio of the rotation speed of the engine 22 to the vehicle speed V is changeable, for example, among six different stages (SP1 to SP6) mainly in a deceleration condition. In this embodiment, in response to the driver's operation of the gearshift lever 81 to the S position, the gearshift position SP is set to the fifth stage SP5. The gearshift position sensor 82 then detects the setting of the gearshift position SP=SP5. At the subsequent setting of the gearshift lever 81 to the upshift instruction position, the gearshift position SP is shifted up by one stage (upshift). At the subsequent setting of the gearshift lever 81 to the downshift instruction position, the gearshift position SP is shifted down by one stage (downshift). The gearshift position sensor 82 detects and outputs the current setting of the gearshift position SP, according to driver's operation of the gearshift lever 81.

The hybrid vehicle 20 of the embodiment thus constructed calculates a torque demand to be output to the ring gear shaft 32*a* functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32*a*. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32*a*. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32*a*, simultaneously with charge or discharge of the battery 50. The motor drive mode stops the operations of the engine 22 and drives and controls the motor MG2 to output a quantity of power equivalent to the required level of power to the ring gear shaft 32*a*.

Figure 5:
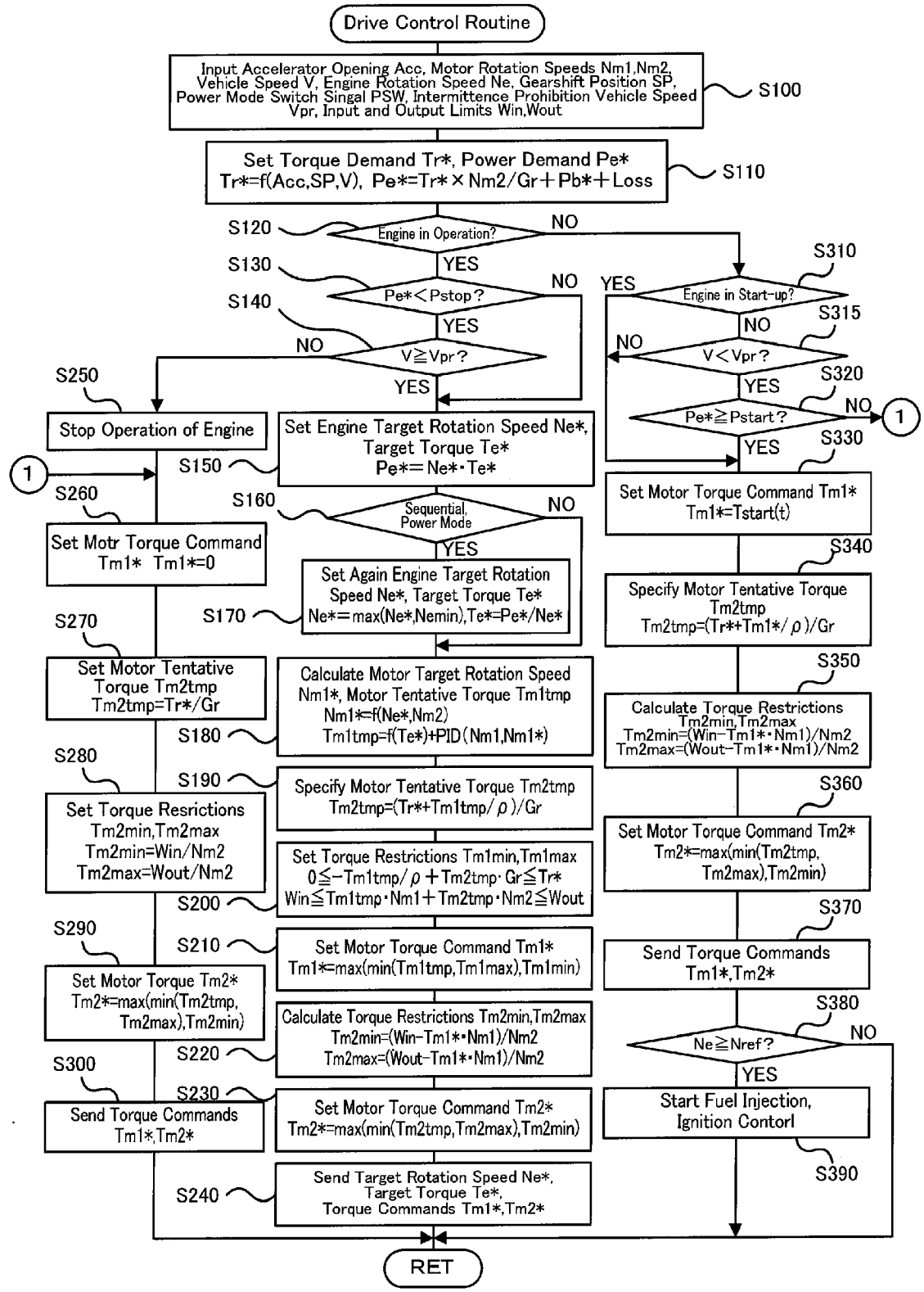
FIG. 5 is a flowchart showing a drive control routine executed by a hybrid electronic control unit 70 in the embodiment.
Figure 6:
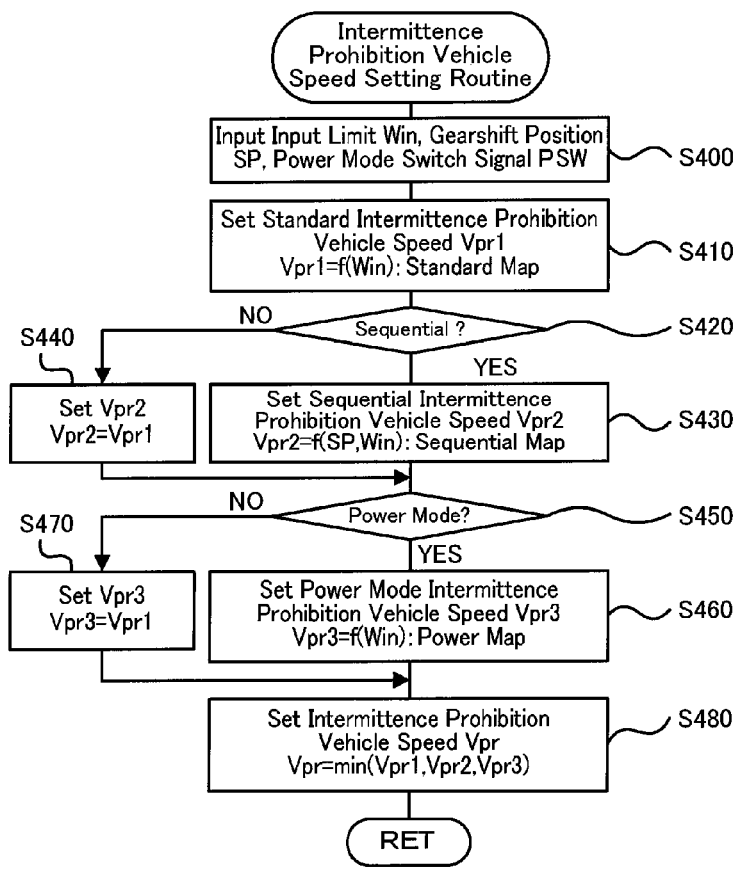
FIG. 6 is a flowchart showing an intermittence prohibition vehicle speed setting routine executed by the hybrid electronic control unit 70 in the embodiment.

The description regards the operations of the hybrid vehicle 20 of the embodiment having the configuration discussed above. FIG. 5 is a flowchart showing a drive control routine executed by the hybrid electronic control unit 70. FIG. 6 is a flowchart showing an intermittence prohibition vehicle speed setting routine for setting an intermittence prohibition vehicle speed Vpr (a lower limit of the region of vehicle speeds to prohibit an intermittent operation of the engine 22) used in the drive control routine, executed by the hybrid electronic control unit 70. The drive control routine and the intermittence prohibition vehicle speed setting routine are performed repeatedly at preset time intervals (for example, at every several msec). A setting process of the intermittence prohibition vehicle speed Vpr is explained first referring to the intermittence prohibition vehicle speed setting routine of FIG. 6, and a drive control is explained next referring to the drive control routine of FIG. 5, for convenience of explanation.

In the intermittence prohibition vehicle speed setting routine, the CPU 72 of the hybrid electronic control unit 70 inputs various data required for setting the intermittence prohibition vehicle speed Vpr, for example, the input limit Win of the battery 50, the gearshift position SP from the gearshift position sensor 82, and the power mode switch signal PSW from the power mode switch 89 (step S400). The input limit Win of the battery 50 is set based on the battery temperature Tb and the state of charge (SOC) of the battery 50 and is input from the battery ECU 52 by communication.

Figure 7:
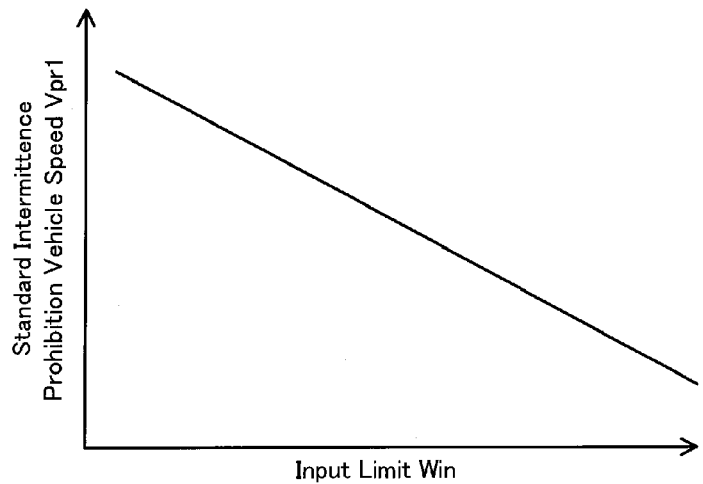
FIG. 7 shows one example of a standard intermittence prohibition vehicle speed setting map.

After the data input, the CPU 72 sets a standard intermittence prohibition vehicle speed Vpr1 based on the input limit Win of the battery 50 input at S100 (step S410). This standard intermittence prohibition vehicle speed Vpr1 is set to have a decreasing tendency with an increase in the input limit Win of the battery 50, that is, to have a decreasing tendency with a decrease in the absolute value of the input limit Win in consideration of the input limit Win being a negative value. A concrete procedure of setting the standard intermittence prohibition vehicle speed Vpr1 in this embodiment provides and stores in advance variations in intermittence prohibition vehicle speed Vpr1 against the input limit Win of the battery 50 as an standard intermittence prohibition vehicle speed setting map in the ROM 74 and reads the standard intermittence prohibition vehicle speed Vpr1 corresponding to the given input limit Win from this standard intermittence prohibition vehicle speed setting map. One example of the standard intermittence prohibition vehicle speed setting map is shown in FIG. 7.

Figure 8:
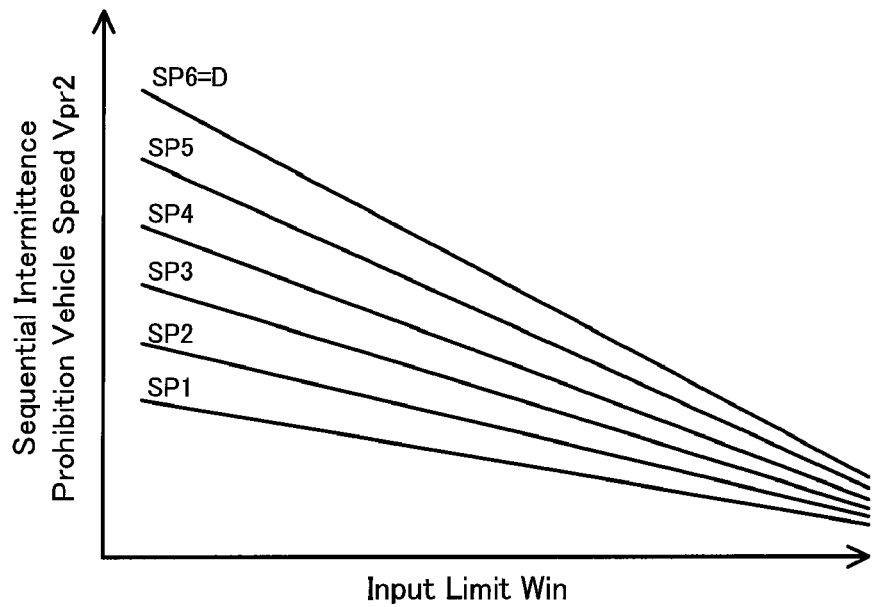
FIG. 8 shows one example of a sequential intermittence prohibition vehicle speed setting map.

The CPU 72 subsequently identifies whether the gearshift position SP is the sequential gearshift position (S position) or not (step S420). When the gearshift position SP is the S position, the CPU 72 sets a sequential intermittence prohibition vehicle speed Vpr2 based on the gearshift position SP and the input limit Win of the battery 50 (step S430). When the gearshift position SP is not the S position, the sequential intermittence prohibition vehicle speed Vpr2 is set equivalent to the standard intermittence prohibition vehicle speed Vpr1 (step S440). The sequential intermittence prohibition vehicle speed Vpr2 is set to have a tendency to be smaller against a lower stage of the gearshift position SP, that is, to have a decreasing tendency with an increase of the torque demand Tr* toward a negative direction (increase as braking force) in a state of accelerator-off and brake-off. The torque demand Tr* is to be applied to the ring gear shaft 32a or the driveshaft linked with an axle of the hybrid vehicle 20. The sequential intermittence prohibition vehicle speed Vpr2 is set to have another decreasing tendency with an increase in the input limit Win (decrease in the absolute value of the input limit Win) of the battery 50. A concrete procedure of setting the sequential intermittence prohibition vehicle speed Vpr2 in this embodiment provides and stores in advance variations in sequential intermittence prohibition vehicle speed Vpr2 against the input limit Win of the battery 50 with regard to various settings of the gearshift position SP as a sequential intermittence prohibition vehicle speed setting map in the ROM 74 and reads the sequential intermittence prohibition vehicle speed Vpr2 corresponding to the given gearshift position SP and the given input limit Win of the battery 50 from this sequential intermittence prohibition vehicle speed setting map. One example of the sequential intermittence prohibition vehicle speed setting map is shown in FIG. 8. The sequential intermittence prohibition vehicle speed Vpr2 for the gearshift position SP being SP6 is set to the same value as the one for the gearshift position SP being the D position. The reason why the sequential intermittence prohibition vehicle speed Vpr2 is set equivalent to the standard intermittence prohibition vehicle speed Vpr1, when the gearshift position SP is not the S position, is to avoid selecting the sequential intermittence prohibition vehicle speed Vpr2 when the gearshift position SP is not the S position at the processing described later.

Figure 9:
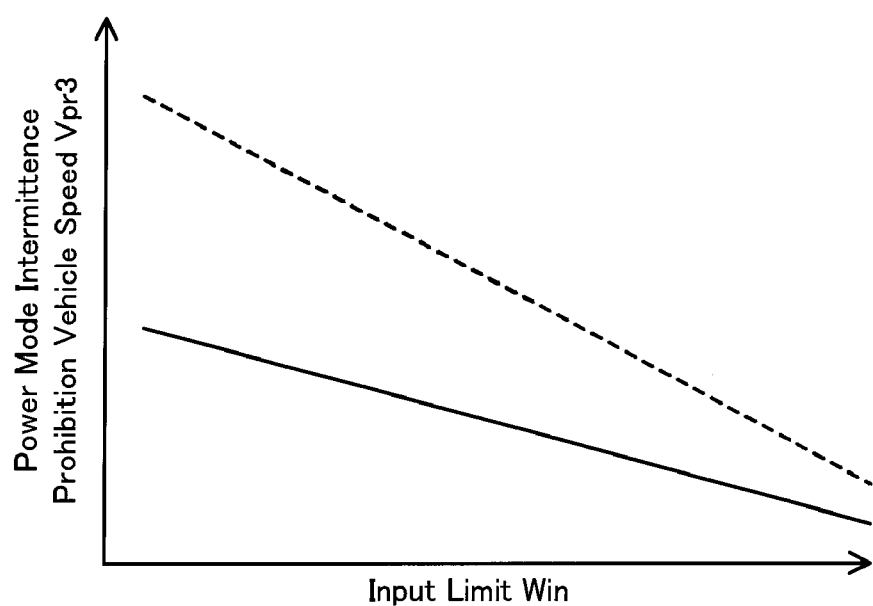
FIG. 9 shows one example of a power mode intermittence prohibition vehicle speed setting map.

The CPU 72 next identifies whether a power mode is set or not based on the power mode signal PSW (step S450). When the power mode is set, the CPU 72 sets a power mode intermittence prohibition vehicle speed Vpr3 based on the input limit Win of the battery 50 (step S460). When the power mode is not set, the power mode intermittence prohibition vehicle speed Vpr3 is set equivalent to the standard intermittence prohibition vehicle speed Vpr1 (step S470). This power mode intermittence prohibition vehicle speed Vpr3 is set to have a decreasing tendency with an increase in the input limit Win (decrease in the absolute value of the input limit Win) of the battery 50 in the same way as the standard intermittence prohibition vehicle speed Vpr1 has, but is set to be smaller value than the standard intermittence prohibition vehicle speed Vpr1. A concrete procedure of setting the power mode intermittence prohibition vehicle speed Vpr3 in this embodiment provides and stores in advance variations in intermittence prohibition vehicle speed Vpr3 against the input limit Win of the battery 50 as a power mode intermittence prohibition vehicle speed setting map in the ROM 74 and reads the power mode intermittence prohibition vehicle speed Vpr3 corresponding to the given input limit Win from this power mode intermittence prohibition vehicle speed setting map. One example of the power mode intermittence prohibition vehicle speed setting map is shown in FIG. 9. In FIG. 9, the solid line shows a power mode intermittence prohibition vehicle speed setting map, and the broken line shows the standard intermittence prohibition vehicle speed setting map for comparison. The reason why the power mode intermittence prohibition vehicle speed Vpr3 is set equivalent to the standard intermittence prohibition vehicle speed Vpr1, when the power mode is not set, is to avoid selecting the power mode intermittence prohibition vehicle speed Vpr3 when the power mode is not set at the processing described later.

After the setting of the standard intermittence prohibition vehicle speed Vpr1, the sequential intermittence prohibition vehicle speed Vpr2, and the power mode intermittence prohibition vehicle speed Vpr3, the CPU 72 sets the smallest of these to an intermittence prohibition vehicle speed Vpr (step S480). The intermittence prohibition vehicle speed setting routine is then terminated.

The following description regards the drive control using the intermittence prohibition vehicle speed Vpr set as described above. In the drive control routine, the CPU 72 of the hybrid electronic control unit 70 inputs various data required for drive control, for example, the accelerator opening Acc from the accelerator pedal position sensor 84, the vehicle speed V from the vehicle speed sensor 88, the rotation speed Ne of the engine 22, the rotation speeds Nm1 and Nm2 of the motors MG1 and MG2, the gearshift position SP from the gearshift position sensor 82, the intermittence prohibition vehicle speed Vpr, the power mode switch signal PSW from the power mode switch 89, and the input limit Win and the output limit Wout of the battery 50 (step S100). The rotation speed Ne of the engine 22 is computed from the crank position detected by the crank position sensor 140 and is input from the engine ECU 24 by communication. The rotation speeds Nm1 and Nm2 of the motors MG1 and MG2 are computed from the rotational positions of the rotors in the motors MG1 and MG2 detected by the rotational position detection sensors 43 and 44 and are input from the motor ECU 40 by communication. The input limit Win and the output limit Wout of the battery 50 are set based on the battery temperature Tb and the state of charge (SOC) of the battery 50 and are input from the battery ECU 52 by communication. The intermittence prohibition vehicle speed Vpr is set in the intermittence prohibition vehicle speed setting routine of FIG. 6 described above and input.

Figure 10:
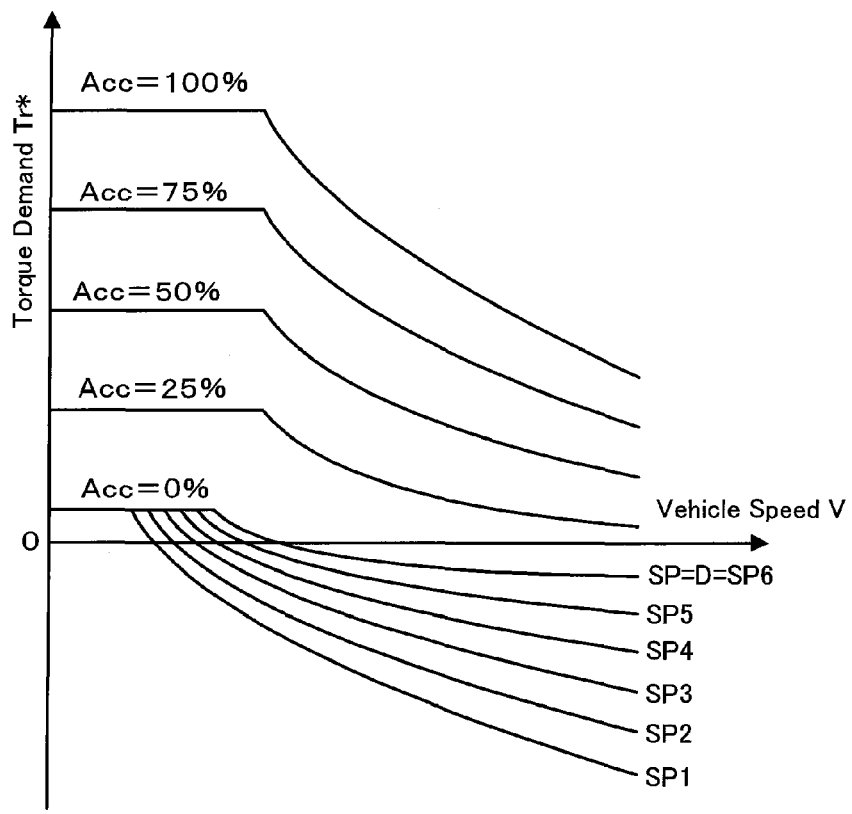
FIG. 10 shows one example of a torque demand setting map.

After the data input, the CPU 72 sets a torque demand Tr* to be output to the ring gear shaft 32a or the driveshaft linked with the drive wheels 63a and 63b as a torque required for the hybrid vehicle 20 and a power demand Pe* required for the engine 22 based on the input accelerator opening Acc and the input vehicle speed V (step S110). A concrete procedure of setting the torque demand Tr* in this embodiment provides and stores in advance variations in torque demand Tr* against the vehicle speed V with regard to various settings of the accelerator opening Acc as a torque demand setting map in the ROM 74 and reads the torque demand Tr* corresponding to the given accelerator opening Acc and the given vehicle speed V from this torque demand setting map. One example of the torque demand setting map is shown in FIG. 10. The power demand Pe* is calculated as the sum of the product of the set torque demand Tr* and a rotation speed Nr of the ring gear shaft 32a, the charge-discharge power demand Pb* to be charged into or discharged from the battery 50, and a potential loss. The rotation speed Nr of the ring gear shaft 32a is obtained by multiplying the vehicle speed V by a preset conversion factor k (Nr=k·V) or by dividing the rotation speed Nm2 of the motor MG2 by a gear ratio Gr of the reduction gear 35 (Nr=Nm2/Gr).

It is then identified whether the engine 22 is in operation or not (step S120). When it is identified that the engine 22 is in operation, the CPU 72 determines whether or not the set power demand Pe* is less than a reference value Pstop used as a criterion for stopping the operation of the engine 22 (step S130). The reference value Pstop is set close to a lower limit value in a power range of ensuring relatively efficient operation of the engine 22.

Figure 11:
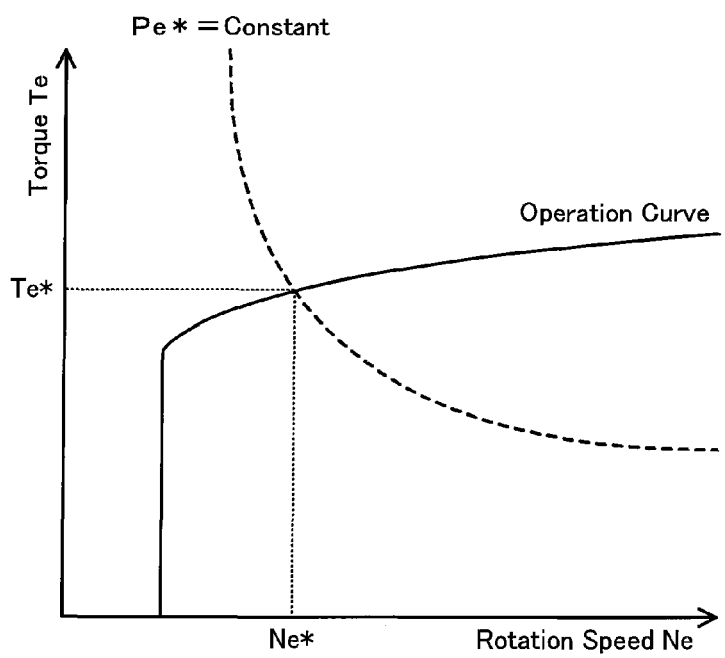
FIG. 11 shows an operation curve of the engine 22 used to set the target rotation speed Ne* and the target torque Te*.

When the power demand Pe* is more than or equal to the reference value Pstop, there is a requirement for keeping the operation of the engine 22. A target rotation speed Ne* and a target torque Te* defining a target drive point of the engine 22 are set, based on the set power demand Pe* of the engine 22 (step S150). In this embodiment, the target rotation speed Ne* and the target torque Te* are determined according to an operation curve of ensuring efficient operation of the engine 22 and a curve of the engine power demand Pe*. FIG. 11 shows an operation curve of the engine 22 used to set the target rotation speed Ne* and the target torque Te*. As clearly shown in FIG. 11, the target rotation speed Ne* and the target torque Te* are given as an intersection of the operation curve and a curve of constant power demand Pe* (=Ne*×Te*).

Figure 12:
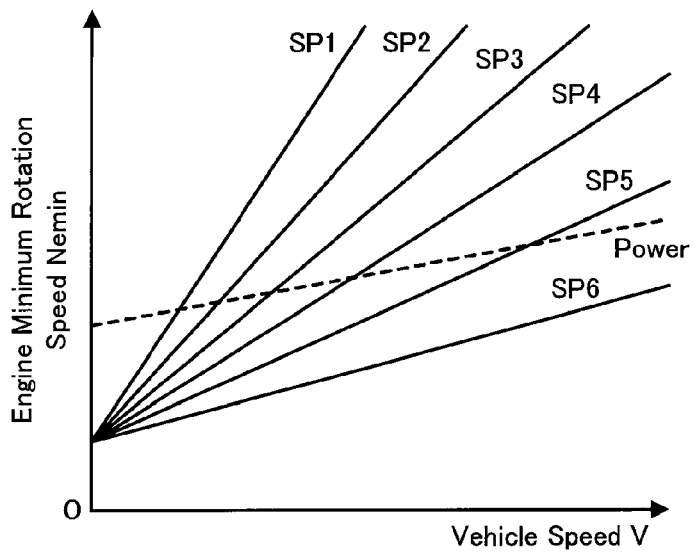
FIG. 12 shows one example of an engine minimum rotation speed setting map.

It is then identified whether the gearshift position SP is the sequential gearshift position (S position) or not, and whether the power mode is set or not (step S160). When the gearshift position SP is the S position or the power mode is set, the CPU 72 sets the greater between an engine minimum rotation speed Nemin based on the gearshift position SP and the vehicle speed V and the set the target rotation speed Ne* to the target rotation speed Ne* again and sets the target torque Te* again by dividing the power demand Pe* by the set target rotation speed Ne* (step S170). When the gearshift position SP is the S position, the engine minimum rotation speed Nemin is set according to the gearshift position SP, that is the engine minimum rotation speed Nemin is set to be a smaller value against a higher stage at the same vehicle speed V. A concrete procedure of setting the engine minimum rotation speed Nemin in this embodiment provides and stores in advance variations in engine minimum rotation speed Nemin against the vehicle speed V with regard to various settings of the gearshift position SP as an engine minimum rotation speed setting map in the ROM 74 and reads the engine minimum rotation speed Nemin corresponding to the given gearshift position SP and the given vehicle speed V from this engine minimum rotation speed setting map. When the power mode is set, the engine minimum rotation speed Nemin is set to a rotation speed that enables the engine 22 to quickly output torque according to the vehicle speed V. A concrete procedure of setting the engine minimum rotation speed Nemin in this embodiment provides and stores in advance variations in engine minimum rotation speed Nemin against the vehicle speed V as an engine minimum rotation speed setting map in the ROM 74 and reads engine minimum rotation speed Nemin corresponding to the given vehicle speed V from this engine minimum rotation speed setting map. One example of the engine minimum rotation speed setting map is shown in FIG. 12. In FIG. 12, the six solid lines show an engine minimum rotation speed setting map used when the gearshift position SP is the S position, the broken line shows an engine minimum rotation speed setting map used when the power mode is set. When the gearshift position SP is the S position as well as the power mode is set, the target rotation speed Ne* and the target torque Te* of the engine 22 are set again through setting the greater one between the engine minimum rotation speed Nemin for the gearshift position SP being the S position and the engine minimum rotation speed Nemin for the set power mode to the engine minimum rotation speed Nemin. When the gearshift position SP is not the S position and the power mode is not set, the target rotation speed Ne* and the target torque Te* of the engine 22 are not set again.

The CPU 72 subsequently calculates a target rotation speed Nm1* of the motor MG1 from the target rotation speed Ne* of the engine 22, the rotation speed Nm2 of the motor MG2, and a gear ratio ρ of the power distribution integration mechanism 30 according to Equation (1) given below, while calculating a tentative torque Tm1tmp as a provisional value of torque to be output from the motor MG1 from the calculated target rotation speed Nm1* and the input rotation speed Nm1 of the motor MG1 according to Equation (2) given below (step S180):

$$Nm1^* = Ne^* \cdot (1+\rho)/\rho - Nm2/(Gr \cdot \rho) \qquad (1)$$

$$Tm1tmp = \rho \cdot Te^*/(1+\rho) + k1(Nm1^* - Nm1) + k2 \int (Nm1^* - Nm1)dt \qquad (2)$$

Figure 13:
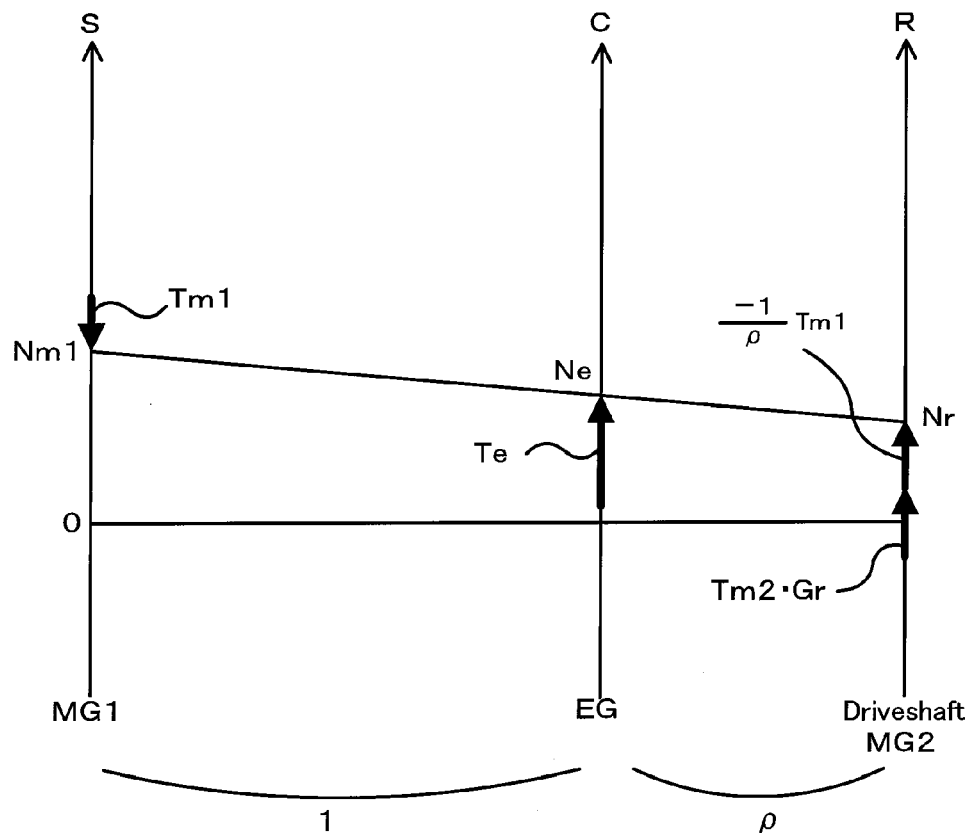
FIG. 13 is an alignment chart showing torque-rotation speed dynamics of the respective rotational elements included in the power distribution integration mechanism 30 during the drive of the hybrid vehicle 20 with output power of the engine 22.

Equation (1) is a dynamic relational expression of respective rotational elements included in the power distribution integration mechanism 30. FIG. 13 is an alignment chart showing torque-rotation speed dynamics of the respective rotational elements included in the power distribution integration mechanism 30 during the drive of the hybrid vehicle 20 with output power of the engine 22. The left axis 'S' represents a rotation speed of the sun gear 31 that is equivalent to the rotation speed Nm1 of the motor MG1. The middle axis 'C' represents a rotation speed of the carrier 34 that is equivalent to the rotation speed Ne of the engine 22. The right axis 'R' represents the rotation speed Nr of the ring gear 32 obtained by dividing the rotation speed Nm2 of the motor MG2 by the gear ratio Gr of the reduction gear 35. Equation (1) is readily introduced from this alignment chart. Two thick arrows on the axis 'R' respectively show a torque applied to the ring gear shaft 32a by output of the torque Tm1 from the motor MG1, and a torque applied to the ring gear shaft 32a via the reduction gear 35 by output of the torque Tm2 from the motor MG2. Equation (2) is a relational expression of feedback control to drive and rotate the motor MG1 at the target rotation speed Nm1*. In Equation (2) given above, 'k1' in the second term and 'k2' in the third term on the right side respectively denote a gain of the proportional and a gain of the integral term.

The CPU 72 subsequently adds the result of division of the tentative torque Tm1tmp by the gear ratio ρ of the power distribution integration mechanism 30 to the torque demand Tr*, and specifies a tentative torque Tm2tmp as a provisional value of torque to be output from the motor MG2 according to Equation (3) given below (step S190):

$$Tm2tmp = (Tr^* + Tm1tmp/\rho)/Gr \qquad (3)$$

The CPU 72 then sets an upper torque restriction Tm1max and a lower torque restriction Tm1min as allowable minimum and maximum torques to satisfy both Expressions (4) and (5) given below (step S200):

$$0 \leq -Tm1tmp/\rho + Tm2tmp \cdot Gr \leq Tr^* \qquad (4)$$

$$Win \leq Tm1tmp \cdot Nm1 + Tm2tmp \cdot Nm2 \leq Wout \qquad (5)$$

Figure 14:
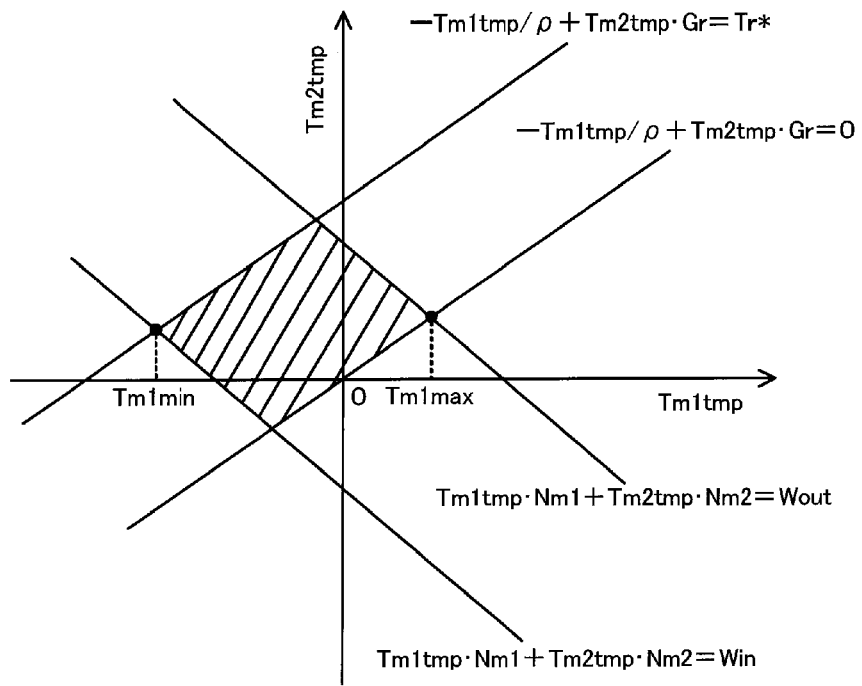
FIG. 14 shows one set of examples of the upper torque restriction Tm1max and the lower torque restriction Tm1min.

Equation (3) given above is readily introduced from the alignment chart of FIG. 13. Expression (4) is a relational expression showing that the sum of the torques output from the motors MG1 and MG2 to the ring gear shaft 32a is within a range of 0 to the torque demand Tr*. Expression (5) is a relational expression showing that the sum of the electric powers input into and output from the motors MG1 and MG2 is in a range of the input limit Win and the output limit Wout of the battery 50. One set of examples of the upper torque restriction Tm1max and the lower torque restriction Tm1min is shown in FIG. 14. The upper torque restriction Tm1max and the lower torque restriction Tm1min are obtained as a maximum value and a minimum value of the tentative torque Tm1tmp in a hatched area.

After the setting of the upper torque restriction Tm1max and lower torque restriction Tm1min, a torque command Tm1* of the motor MG1 is set by limiting the set tentative torque Tm1tmp at step S180 with the set upper torque restriction Tm1max and lower torque restriction Tm1min according to Equation (6) below (step S210)

$$Tm1^* = \max(\min(Tm1tmp, Tm1\max), Tm1\min) \quad (6)$$

The CPU 72 subsequently calculates a lower torque restriction Tm2min and an upper torque restriction Tm2max as allowable minimum and maximum torques output from the motor MG2 according to Equations (7) and (8) given below (step S220):

$$Tm2\min = (Win - Tm1^* \cdot Nm1)/Nm2 \quad (7)$$

$$Tm2\max = (Wout - Tm1^* \cdot Nm1)/Nm2 \quad (8)$$

The lower torque restriction Tm2min and the upper torque restriction Tm2max are obtained by dividing respective differences between the input limit Win or the output limit Wout of the battery 50 and power consumption (power generation) of the motor MG1, which is the product of the calculated torque command Tm1* and the current rotation speed Nm1 of the motor MG1, by the current rotation speed Nm2 of the motor MG2. The CPU 72 then limits the specified tentative torque Tm2tmp at step S190 by the lower torque restriction Tm2min and upper torque restriction Tm2max according to Equation (9) given below to set a torque command Tm2* of the motor MG2 (step S230):

$$Tm2^* = \max(\min(Tm2tmp, Tm2\max), Tm2\min) \quad (9)$$

After setting the target rotation speed Ne* and the target torque Te* of the engine 22 and the torque commands Tm1* and Tm2* of the motors MG1 and MG2, the CPU 72 sends the settings of the target rotation speed Ne* and the target torque Te* of the engine 22 to the engine ECU 24 and the settings of the torque commands Tm1* and Tm2* of the motors MG1 and MG2 to the motor ECU 40 (step S240) and terminates the drive control routine. In response to reception of the settings of the target rotation speed Ne* and the target torque Te*, the engine ECU 24 performs required controls including intake air flow regulation, ignition control, and fuel injection control of the engine 22 to drive the engine 22 at the specific drive point defined by the combination of the target rotation speed Ne* and the target torque Te*. In response to reception of the settings of the torque commands Tm1* and Tm2*, the motor ECU 40 performs switching control of the inverter 41, 42 to drive the motor MG1 with the torque command Tm1* and the motor MG2 with the torque command Tm2*. Such control enables the torque demand Tr* within the range of the input limit Win and the output limit Wout of the battery 50 to be output to the ring gear shaft 32a or the driveshaft for driving the hybrid vehicle 20 while operating the engine 22 efficiently.

When it is determined that the power demand Pe* is less than the reference value Pstop at step S130, the CPU 72 compares the vehicle speed V with the intermittence prohibition vehicle speed Vpr (step S140). When the vehicle speed V is more than or equal to the intermittence prohibition vehicle speed Vpr, the intermittent operation of the engine 22 is prohibited and there is a requirement for keeping the operation of the engine 22 without stopping the engine 22. The processing of steps S150 to S240 is then executed as described above.

Figure 15:
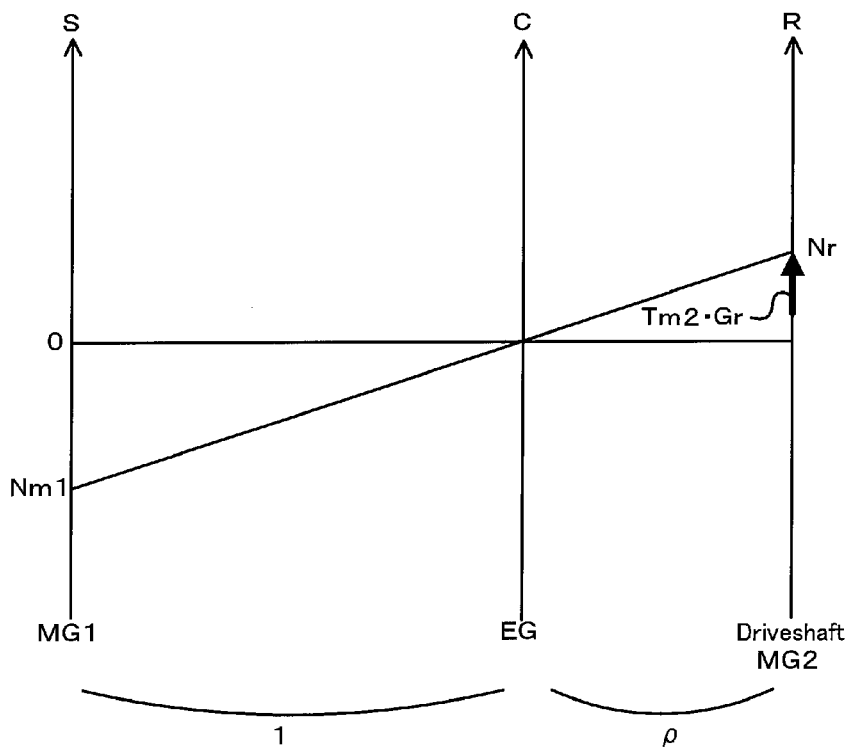
FIG. 15 is an alignment chart showing torque-rotation speed dynamics of the respective rotational elements included in the power distribution integration mechanism 30 during the drive of the hybrid vehicle 20 in operation stop of the engine 22.

When it is determined at step S130 that the power demand Pe* is less than the reference value Pstop and also determined at step S140 that the vehicle speed V is less than the intermittence prohibition vehicle speed Vpr, on the other hand, the intermittent operation of the engine 22 is permitted and there is a requirement for stopping the operation of the engine 22. The CPU 72 then sends a control signal to the engine ECU 24 to stop the operation of the engine 22 by interrupting the fuel injection control and the ignition control and accordingly stop the operation of the engine 22 (step S250) and sets 0 to the torque command Tm1* of the motor MG1 (step S260). The torque demand Tr* divided by the gear ratio Gr of the reduction gear 35 is set as the tentative torque Tm2tmp as the provisional value of torque to be output from the motor MG2 (step S270). Substitution of the torque command Tm1* set equal to 0 into Equations (7) and (8) given above determine the lower torque restriction Tm2min and the upper torque restriction Tm2max of the motor MG2 (step S280). The torque command Tm2* of the motor MG2 is subsequently set by limiting the tentative torque Tm2tmp with the lower torque restriction Tm2min and the upper torque restriction Tm2max according to Equation (9) given above (step S290). The CPU 72 sends the settings of the torque commands Tm1* and Tm2* of the motors MG1 and MG2 to the motor ECU 40 (step S300) and exits from the drive control routine. Such control stops the operation of the engine 22, while enabling the hybrid vehicle 20 to be driven with output of the torque demand Tr* from the motor MG2 to the ring gear shaft 32a or the driveshaft within the range of the input limit Win or the output limit Wout of the battery 50. FIG. 15 is an alignment chart showing torque-rotation speed dynamics of the respective rotational elements included in the power distribution integration mechanism 30 during the drive of the hybrid vehicle 20 in operation stop of the engine 22.

When it is identified at step S120 that the engine 22 is not in operation, that is, the engine 22 is in operation stop, the CPU 72 sequentially determines whether the engine 22 is in a start-up state (step S310), whether the vehicle speed V is less than the intermittence prohibition vehicle speed Vpr (step S315), and whether the power demand Pe* is more than or equal to a reference value Pstart used as a criterion for starting the engine 22 (step S320). The reference value Pstart may be set close to the lower limit value of the power range of ensuring relatively efficient operation of the engine 22. In order to prevent frequent stops and starts of the engine 22, the reference value Pstart is preferably greater than the reference value Pstop used as the criterion for stopping the operation of the engine 22. Under the conditions that the engine 22 is not in the start-up state, that the vehicle speed V is less than the intermittence prohibition vehicle speed Vpr, and that the power demand Pe* is less than the reference value Pstart, it is determined to keep the operation stop state of the engine 22. The processing of steps S260 to S300 is then executed as described above.

Figure 16:
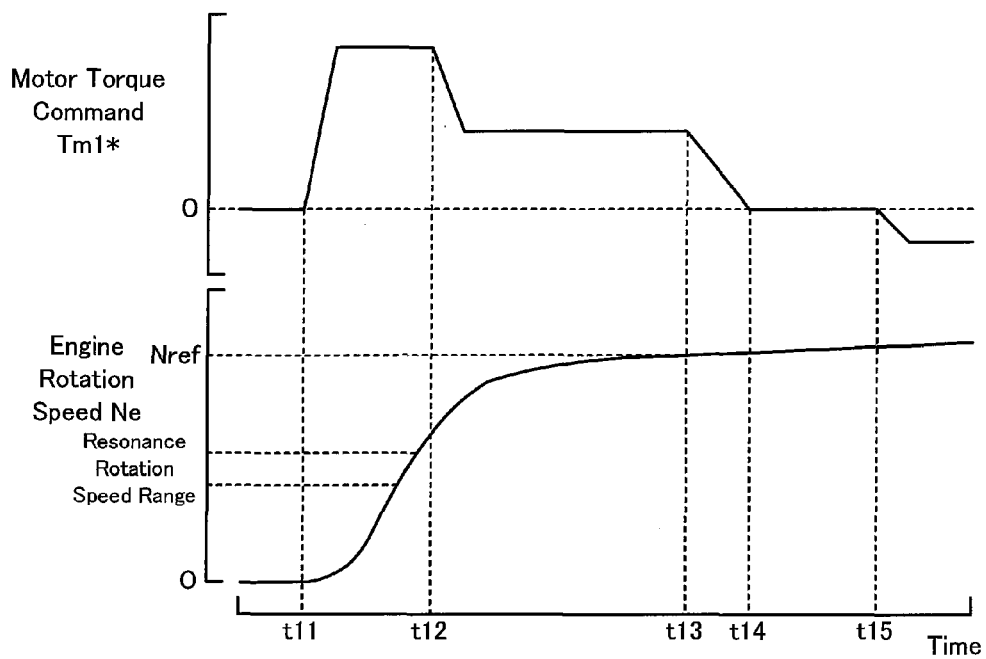
FIG. 16 shows one example of a torque setting map to set the torque command Tm1* of the motor MG1 for starting-up the engine 22 and one example of variations in the rotation speed Ne of the engine 22.

When it is identified at step S120 that the engine 22 is in operation stop and also identified at step S310 that the engine 22 is not in the start-up state, and further, when it is determined at step S315 that the vehicle speed V is more than or equal to the intermittence prohibition vehicle speed Vpr or when it is determined at step S320 that the power demand Pe* is more than or equal to the reference value Pstart while the determination at step S315 that the vehicle speed V is less than the intermittence prohibition vehicle speed Vpr, it is determined to start up the engine 22 and the torque command Tm1* of the motor MG1 is set based on a torque setting map for start-up and the elapsed time 't' since the beginning of the starting operation of the engine 22 (step S330). FIG. 16 shows one example of a torque setting map to set the torque command Tm1* of the motor MG1 for starting-up the engine 22 and one example of variations in the rotation speed Ne of the engine 22. In the torque setting map in this embodiment, immediately after a time point t11 when the starting instruction of the engine 22 is given, the rating process is performed to promptly increase the torque command Tm1* to a relatively large torque and thereby quickly increase the rotation speed Ne of the engine 22. At a time point t12 after the rotation speed Ne of the engine 22 has passed through a resonance rotation speed range or after a required time period for allowing the rotation speed Ne of the engine 22 to pass through the resonance rotation speed range has elapsed since the time point t11, a sufficient torque for stably motoring the engine 22 at a rotation speed of not lower than a rotation speed Nref is set to the torque command Tm1*, in order to reduce the power consumption and the reactive torque at the ring gear shaft 32a or the driveshaft. At a time point t13 when the rotation speed Ne of the engine 22 has reached the rotation speed Nref, the rating process is performed to promptly decrease the torque command Tm1* to 0. At a time point t15 when complete explosive consumption of the engine 22 is identified, a torque for power generation is set to the torque command Tm1*. In this embodiment, the fuel injection control and the ignition control of the engine 22 is started at the rotation speed Nref. In consideration of the current condition for the beginning of the starting operation of the engine 22, the torque command Tm1* is set to a rating value used for the rating process.

After the setting of the torque command Tm1* of the motor MG1, The CPU 72 subsequently adds the result of division of the torque command Tm1* of the motor MG1 by the gear ratio ρ of the power distribution integration mechanism 30 to the torque demand Tr*, and specifies the tentative torque Tm2tmp as a provisional value of torque to be output from the motor MG2, according to Equation (10) given below (step S340):

$$Tm2tmp=(Tr^*+Tm1^*/\rho)/Gr \quad (10)$$

The lower torque restriction Tm2min and the upper torque restriction Tm2max of the motor MG2 are calculated according to Equations (7) and (8) given above (step S350). The torque command Tm2* of the motor MG2 is subsequently set by limiting the tentative torque Tm2tmp with the lower torque restriction Tm2min and the upper torque restriction Tm2max according to Equation (9) given above (step S360). The CPU 72 sends the settings of the torque commands Tm1* and Tm2* of the motors MG1 and MG2 to the motor ECU 40 (step S370).

It is then determined whether the rotation speed Ne of the engine 22 reaches the rotation speed Nref for starting the fuel injection control and the ignition control of the engine 22 (step S380). In consideration of the current condition of the beginning of the starting operation of the engine 22, the rotation speed Ne of the engine 22 is small and has not reached the rotation speed Nref. Therefore, the CPU 72 makes this determination in the negative and exits from the drive control routine without starting the fuel injection control and the ignition control of the engine 22.

When the starting operation of the engine 22 is started, it is identified at step S310 that the engine 22 is in the start-up state. The processing of steps S330 to S380 is then executed, and the CPU 72 waits until the increase of the rotation speed Ne of the engine 22 to or over the rotation speed Nref for starting the fuel injection control and the ignition control (step S380). In response to the increase of the rotation speed Ne of the engine 22 to or over the reference rotation speed Nref, the CPU 72 sends a control signal to the engine ECU 24 to start the fuel injection control and the ignition control (step S390). Such control starts up the engine 22 in operation stop, while enabling the hybrid vehicle 20 to be driven with output of the torque demand Tr* from the motor MG2 to the ring gear shaft 32a or the driveshaft within the range of the input limit Win or the output limit Wout of the battery 50.

Figure 17:
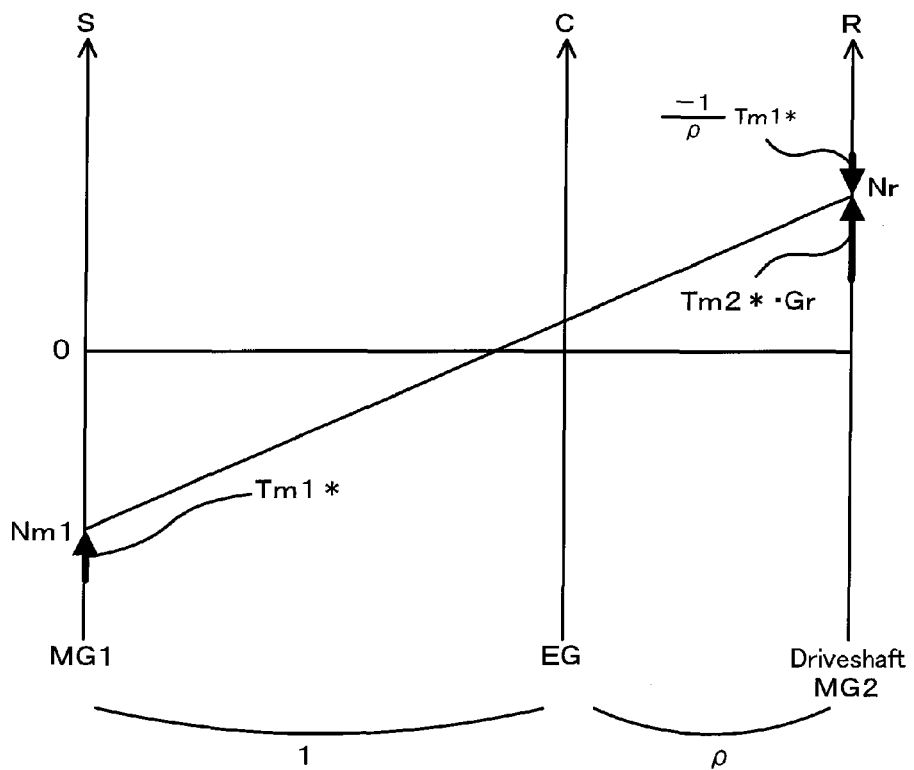
FIG. 17 is an alignment chart showing torque-rotation speed dynamics of the respective rotational elements included in the power distribution integration mechanism 30 during the drive of the hybrid vehicle 20 with motoring of the engine 22.

FIG. 17 is an alignment chart showing torque-rotation speed dynamics of the respective rotational elements included in the power distribution integration mechanism 30 during the drive of the hybrid vehicle 20 with motoring of the engine 22. When the motoring of the engine 22 is performed, the motor MG1 rotates at a high speed toward the negative direction in the case of the vehicle speed V high resulting in the large regenerative electric power of the motor MG1. The regenerative electric power is consumed to some extent by the motor MG2 if the driver is stepping on the accelerator pedal 83, but the regenerative electric power is charged in the battery 50 in the accelerator-off state. In the accelerator-off state, the torque demand Tr* is set as braking force and the motor MG2 may be under regenerative control. In this situation, when the input limit Win of the battery 50 is severe (the absolute value of the input limit Win is small) and the charge in the battery 50 is largely restricted, the torque command Tm2* of the motor MG2 is limited by the input limit Win and there may be a condition where the motor MG2 is disabled to output a regenerative torque (torque-off condition) for a short period of time. In this embodiment, the intermittence prohibition vehicle speed Vpr is set based on the input limit Win in order to prevent the torque-off condition in the accelerator-off state. Especially, when the gearshift position SP is the sequential gearshift position (S position) or the power mode is set, the intermittence prohibition vehicle speed Vpr is set based on the gearshift position SP or the vehicle's mode in addition to the input limit Win. Such control effectively prevents the battery 50 from being charged with excessive electric power due to the regenerative electric power of the motor MG1 at the start of the engine 22 in the drive of the hybrid vehicle 20 with a high speed. Such control accordingly prevents the torque-off condition possible to occur by limiting the torque command Tm2* of the motor MG2 to avoid the battery 50 being charged with this excessive electric power.

In the hybrid vehicle 20 of the embodiment described above, the intermittence prohibition vehicle speed Vpr, as a lower limit of the region of vehicle speeds to prohibit the intermittent operation of the engine 22, is set to be decreasing with an increase in the input limit Win (decrease in the absolute value of the input limit Win) of the battery 50. When the vehicle speed V is less than the intermittence prohibition vehicle speed Vpr, the hybrid vehicle 20 is driven with output of the torque demand Tr* to the ring gear shaft 32a or the driveshaft within the range of the input limit Win or the output limit Wout of the battery 50 with the intermittent operation of the engine 22. When the vehicle speed V is more than or equal to the intermittence prohibition vehicle speed Vpr, the hybrid vehicle 20 is driven with output of the torque demand Tr* to the ring gear shaft 32a or the driveshaft within the range of the input limit Win or the output limit Wout of the battery 50 with continuous operation of the engine 22 in prohibition of the intermittent operation of the engine 22. This arrangement effectively prevents the accumulator from being charged with excessive electric power at the start of the engine 22 in the intermittent operation of the engine 22, and accordingly prevents the torque-off condition possible to occur by limiting the torque command Tm2* to avoid the battery 50 being charged with the excessive electric power. Furthermore, the intermittence prohibition vehicle speed Vpr is set based on the gearshift position SP or the setting of the power mode in addition to the input limit Win, it is thus enabled to set the intermittence prohibition vehicle speed Vpr according to the vehicle's control modes. This arrangement, more effectively, prevents the accumulator from being charged with the excessive electric power at the start of the engine 22 in the intermittent operation of the engine 22 and prevents the torque-off condition possible to occur at the start of the engine 22. As a matter of course, the hybrid vehicle 20 is enabled to be driven with output of the torque demand Tr* set based on the accelerator opening Acc and the vehicle speed V to the ring gear shaft 32a or the driveshaft together with controls of the sequential gearshift, the power mode or the like.

In the hybrid vehicle 20 of the embodiment, the sequential gearshift position (S position) is provided as the gearshift position SP. This is not essential and such a control of the sequential gearshift may not be performed. In this case, the intermittence prohibition vehicle speed Vpr is possible to be set according to the input limit Win of the battery 50 and the setting of the power mode.

The hybrid vehicle 20 of the embodiment is equipped with the power mode switch 89, and controls in the hybrid vehicle 20 are performed with switching between the power mode and the non-power mode (ordinary mode). This is not essential, and the hybrid vehicle 20 may not be equipped with the power mode switch 89 and the setting of the power mode may not be performed. In this case, the intermittence prohibition vehicle speed Vpr is possible to be set according to the input limit Win of the battery 50 and the gearshift position SP.

In the hybrid vehicle 20 of the embodiment, the sequential gearshift position (S position) is provided as the gearshift position SP, and controls are performed with switching between the power mode and the non-power mode (ordinary mode) based on the operation of the power mode switch 89. These are not essential, and both of such a control of the sequential gearshift and the setting of the power mode may not be performed. In this case, the intermittence prohibition vehicle speed Vpr is possible to be set according to the input limit Win of the battery 50.

In the hybrid vehicle 20 of the embodiment, the intermittence prohibition vehicle speed Vpr is set according to the input limit Win of the battery 50, the gearshift position SP, and the setting of the power mode. In one modified embodiment, the intermittence prohibition vehicle speed Vpr may be set according to the other modes than the mode of the sequential gearshift or the power mode as the control modes of the hybrid vehicle 20. The intermittence prohibition vehicle speed Vpr may be set according to, for example, a fuel economy priority mode which further enhances fuel economy allowing vibrations and a little noise or a constant speed drive mode which keeps a set vehicle speed. In this modified example, when the fuel economy priority mode is set, the intermittence prohibition vehicle speed Vpr may be set to a little higher vehicle speed than the standard intermittence prohibition vehicle speed Vpr1 to widen a permitted area of the intermittent operation of the engine 22. In this modified example, when the constant speed drive mode is set, the intermittence prohibition vehicle speed Vpr may be set to a lower vehicle speed than the standard intermittence prohibition vehicle speed Vpr1 to perform a constant speed drive with stability.

In the hybrid vehicle 20 of the embodiment, the intermittence prohibition vehicle speed Vpr is set as the smallest of the standard intermittence prohibition vehicle speed Vpr1, the sequential intermittence prohibition vehicle speed Vpr2, and the power mode intermittence prohibition vehicle speed Vpr3. The intermittence prohibition vehicle speed Vpr may be set as the average value or the median value of the standard intermittence prohibition vehicle speed Vpr1, the sequential intermittence prohibition vehicle speed Vpr2, and the power mode intermittence prohibition vehicle speed Vpr3. In the hybrid vehicle 20 of the embodiment, the torque command Tm1* of the motor MG1 is set by obtaining the upper and lower torque restrictions Tm1max and Tm1min which satisfy both Expressions (4) and (5) described above for limiting the tentative torque Tm1tmp of the motor MG1, and the torque command Tm2* of the motor MG2 is set by obtaining the upper and lower torque restrictions Tm2max and Tm2min according to Equations (7) and (8) described above. In one modified example, the torque command Tm1* of the motor MG1 may be set equivalent to the tentative torque Tm1tmp without any limitations by the upper and lower torque restrictions Tm1max and Tm1min which satisfies both Expressions (4) and (5), and the torque command Tm2* may be set by obtaining the upper and lower torque restrictions Tm2max and Tm2min according to Equations (7) and (8) using the set the torque command Tm1* of the motor MG1. Otherwise, any other methods may be adopted to set the torque commands Tm1* and Tm2* of the motor MG1 and MG2 within the range of input limit Win and the output limit Wout of the battery 50 using the rotation speed Nm2 or the predicted rotation speed Nm2est of the motor MG2.

In the hybrid vehicle 20 of the embodiment, the motor MG2 is attached to the ring gear shaft 32a or the driveshaft via the reduction gear 35. The technique of the invention is also applicable to the motor MG2 directly attached to the ring gear shaft 32a, and also applicable to the motor MG2 attached to the ring gear shaft 32a via a transmission such as a two-stage, three-stage, or four-stage transmission in place of the reduction gear 35.

Figure 18:
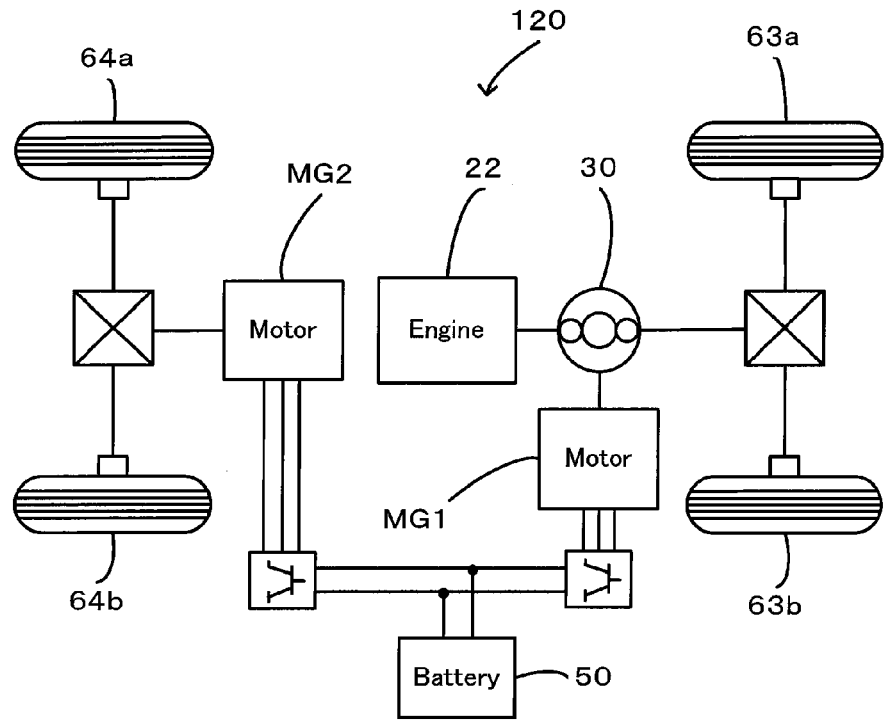
FIG. 18 schematically illustrates the configuration of another hybrid vehicle 120 in one modified example.

In the hybrid vehicle 20 of the embodiment, the power of the motor MG2 is converted by the reduction gear 35 and is output to the ring gear shaft 32a. The technique of the invention is also applicable to a hybrid vehicle 120 of a modified structure shown in FIG. 18. In the hybrid vehicle 120 of FIG. 18, the power of the motor MG2 is connected to another axle (an axle linked with wheels 64a and 64b in FIG. 18) that is different from the axle connecting with the ring gear shaft 32a (the axle linked with the drive wheels 63a and 63b).

Figure 19:
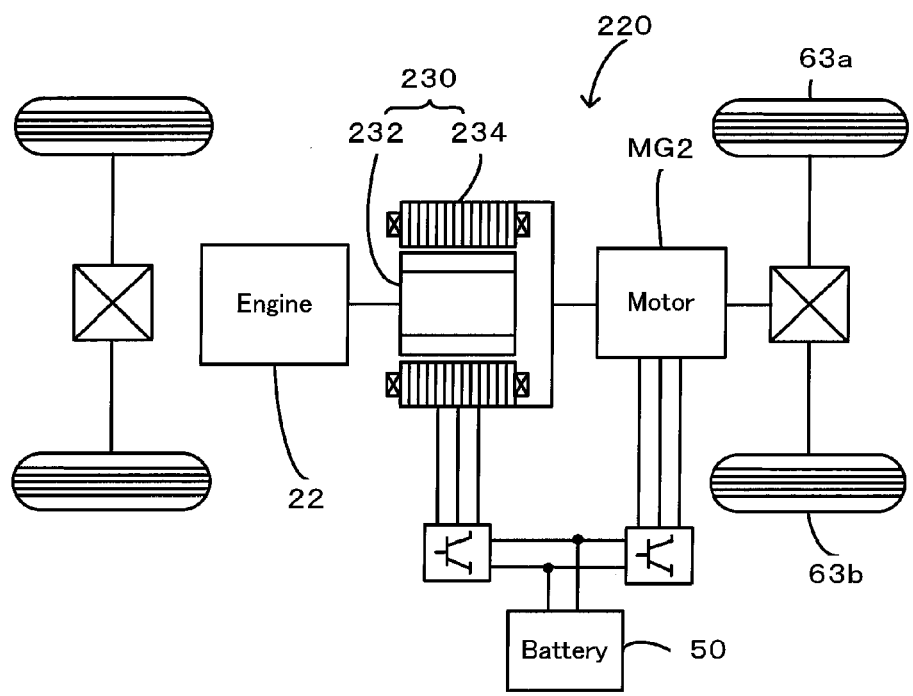
FIG. 19 schematically illustrates the configuration of still another hybrid vehicle 220 in another modified example.

In the hybrid vehicle 20 of the embodiment, the power of the engine 22 is output via the power distribution integration mechanism 30 to the ring gear shaft 32a or the driveshaft linked with the drive wheels 63a and 63b. The technique of the invention is also applicable to a hybrid vehicle 220 of another modified structure shown in FIG. 19. The hybrid vehicle 220 of FIG. 19 is equipped with a pair-rotor motor 230. The pair-rotor motor 230 includes an inner rotor 232 connected to the crankshaft 26 of the engine 22 and an outer rotor 234 connected to a driveshaft for outputting power to the drive wheels 63a and 63b. The pair-rotor motor 230 transmits part of the output power of the engine 22 to the driveshaft, while converting the residual engine output power into electric power.

The embodiment and its modified examples regard application of the invention to the hybrid vehicles. The principle of the invention may be actualized by diversity of other applications, for example, vehicles other than motor vehicles as well as a control method of such a vehicle.

The primary elements in the embodiment and its modified examples are mapped to the primary constituents in the claims of the invention as described below. The engine 22 in the embodiment corresponds to the 'internal combustion engine' in the claims of the invention. The combination of the power distribution integration mechanism 30 with the motor MG1 corresponds to the 'electric power-mechanical power input output assembly' in the claims of the invention. The motor MG2 in the embodiment corresponds to the 'motor' in the claims of the invention. The battery 50 in the embodiment corresponds to the 'accumulator' in the claims of the invention. The battery ECU 52 computing the input limit Win as an allowable charging electric power to be charged in the battery 50 and the output limit Wout as an allowable discharging electric power to be discharged from the battery 50 based on the state of charge (SOC) and the temperature Tb of the battery 50, the state of charge (SOC) of the battery 50 being calculated from an integrated value of the charge-discharge current measured by the current sensor, corresponds to the 'input output limits setting module' in the claims of the invention. The hybrid electronic control unit 70 executing the intermittence prohibition vehicle speed setting routine of FIG. 6 to set the intermittence prohibition vehicle speed Vpr to the smallest of the standard intermittence prohibition vehicle speed Vpr1 set according to the input limit Win of the battery 50, the sequential intermittence prohibition vehicle speed Vpr2 set according to the identification whether the gearshift position SP is the sequential gearshift position (S position), the gearshift position SP, and the input limit Win, and the power mode intermittence prohibition vehicle speed Vpr3 set according to the identification whether the power mode is set, corresponds to the 'intermittent operation prohibition vehicle speed setting module' in the claims of the invention. The vehicle speed sensor 88 corresponds to the 'vehicle speed detector' in the claims of the invention. The hybrid electronic control unit 70 executing the processing of step S110 in the drive control routine of FIG. 5 to set the torque demand Tr* based on the accelerator opening Acc and the vehicle speed V corresponds to the 'driving power demand setting module' in the claims of the invention. The combination of the hybrid electronic control unit 70, the engine ECU 24 controlling the engine 22 based on the received target rotation speed Ne* and target torque Te*, and the motor ECU 40 controlling the motors MG1 and MG2 based on the received torque commands Tm1* and Tm2* in the embodiment corresponds to the 'controller' in the claims of the invention. The hybrid electronic control unit 70 sets the target rotation speed Ne* and target torque Te* of the engine 22 and the torque commands Tm1* and Tm2* of the motor MG1 and MG2 so that the hybrid vehicle 20 is driven with output of the torque demand Tr* to the ring gear shaft 32a or the driveshaft within the range of the input limit Win or the output limit Wout of the battery 50 together with the intermittent operation of the engine 22 when the vehicle speed V is less than the intermittence prohibition vehicle speed Vpr, and sends the set target rotation speed Ne* and target torque Te* to the engine ECU 24 and the torque commands Tm1* and Tm2* to the motor ECU 40. The hybrid electronic control unit 70 sets the target rotation speed Ne* and target torque Te* of the engine 22 and the torque commands Tm1* and Tm2* of the motor MG1 and MG2 so that the hybrid vehicle 20 is driven with output of the torque demand Tr* to the ring gear shaft 32a or the driveshaft within the range of the input limit Win or the output limit Wout of the battery 50 together with the continuous operation of the engine 22 in prohibition of the intermittent operation of the engine 22 when the vehicle speed V is more than or equal to the intermittence prohibition vehicle speed Vpr, and sends the set target rotation speed Ne* and target torque Te* to the engine ECU 24 and the torque commands Tm1* and Tm2* to the motor ECU 40. The power mode switch 89 to switch between the power mode and the ordinary mode or the gearshift lever 81 to allow the sequential gearshift position as one of gearshift positions corresponds to the 'control mode setting module' in the claims of the invention. The motor MG1 in the embodiment corresponds to the 'generator' in the claims of the invention. The power distribution integration mechanism 30 in the embodiment corresponds to the 'three shaft-type power input output structure' in the claims of the invention. The pair-rotor motor 230 in the modified example also corresponds to the 'electric power-mechanical power input output assembly' in the claims of the invention.

The 'internal combustion engine' is not restricted to the internal combustion engine designed to consume a hydrocarbon fuel, such as gasoline or light oil, and thereby output power, but may be an internal combustion engine of any other design, for example, a hydrogen engine. The 'electric power-mechanical power input output assembly' is not restricted to the combination of the power distribution integration mechanism 30 with the motor MG1 or to the pair-rotor motor 230, but may be any structure connected with a driveshaft linked to an axle of the vehicle and with an output shaft of the internal combustion engine in such a manner as to be rotatable independently of the driveshaft and configured to input and output power to and from the driveshaft and the output shaft through input and output of electric power and mechanical power. The 'motor' is not restricted to the motor MG2 constructed as a synchronous motor generator but may be any type of motor capable of outputting power to the driveshaft, for example, an induction motor. The 'accumulator' is not restricted to the battery 50 as a secondary battery but may be a capacitor or any other storage unit configured to transmit electric power to and from the electric power-mechanical power input output assembly and the motor. The 'input output limits setting module' is not restricted to the arrangement of computing from the state of charge (SOC) and the temperature Tb of the battery 50, but may be any other arrangement of setting input and output limits of the accumulator as maximum allowable electric powers to be charged in and discharged from the accumulator, according to a state of the accumulator, for example, an arrangement of computing from the internal resistance of the battery 50 in addition to the state of charge (SOC) and the temperature Tb of the battery 50. The 'intermittent operation prohibition vehicle speed setting module' is not restricted to the arrangement of setting the intermittence prohibition vehicle speed Vpr to the smallest of the standard intermittence prohibition vehicle speed Vpr1 set according to the input limit Win of the battery 50, the sequential intermittence prohibition vehicle speed Vpr2 set according to the identification whether the gearshift position SP is the sequential gearshift position (S position), the gearshift position SP, and the input limit Win, and the power mode intermittence prohibition vehicle speed Vpr3 set according to the identification whether the power mode is set, but may be any other arrangement of setting an intermittent operation prohibition vehicle speed for prohibiting an intermittent operation of the internal combustion engine, according to the set input limit of the accumulator, for example, an arrangement of setting the intermittence prohibition vehicle speed Vpr according to the input limit Win of the battery 50 and the setting of the power mode, an arrangement of setting the intermittence prohibition vehicle speed Vpr according only to the input limit Win of the battery 50, or an arrangement of setting the intermittence prohibition vehicle speed Vpr according to the other modes than the mode of the sequential gearshift or the power mode as the control modes of the hybrid vehicle 20. The 'vehicle speed detector' is not restricted to the vehicle speed sensor 88 but may be any other arrangement of detecting a vehicle speed, for example, an arrangement of calculating the vehicle speed V from the rotation speed of the ring gear shaft 32*a* or the driveshaft, or an arrangement of calculating the vehicle speed V based on the signals from wheel speed sensors attached to the drive wheels 63*a* and 63*b* or driven wheels. The 'driving power demand setting module' is not restricted to the arrangement of setting the torque demand Tr* based on the accelerator opening Acc and the vehicle speed V but may be any other arrangement of setting a driving power demand required for driving the vehicle, for example, an arrangement of setting the torque demand based only on the accelerator opening Acc or an arrangement of setting the torque demand based on a location of the vehicle on a preset drive route. The 'controller' is not restricted to the combination of the hybrid electronic control unit 70 with the engine ECU 24 and the motor ECU 40 but may be actualized by a single electronic control unit. The 'controller' is not restricted to the arrangement of controlling the engine 22 and the motor MG1 and MG2 by setting the target rotation speed Ne* and target torque Te* of the engine 22 and the torque commands Tm1* and Tm2* of the motor MG1 and MG2 so that the hybrid vehicle 20 is driven with output of the torque demand Tr* to the ring gear shaft 32*a* or the driveshaft within the range of the input limit Win or the output limit Wout of the battery 50 together with the intermittent operation of the engine 22 when the vehicle speed V is less than the intermittence prohibition vehicle speed Vpr, and controlling the engine 22 and the motor MG1 and MG2 by setting the target rotation speed Ne* and target torque Te* of the engine 22 and the torque commands Tm1* and Tm2* of the motor MG1 and MG2 so that the hybrid vehicle 20 is driven with output of the torque demand Tr* to the ring gear shaft 32*a* or the driveshaft within the range of the input limit Win or the output limit Wout of the battery 50 together with the continuous operation of the engine 22 in prohibition of the intermittent operation of the engine 22 when the vehicle speed V is more than or equal to the intermittence prohibition vehicle speed Vpr, but may be any other arrangement of controlling, when the detected vehicle speed is less than the set intermittent operation prohibition vehicle speed, the internal combustion engine, the electric power-mechanical power input output assembly, and the motor so that the vehicle is driven with a driving power corresponding to the set driving power demand in a range defined by the set input and output limits of the accumulator with the intermittent operation of the internal combustion engine, and controlling, when the detected vehicle speed is more than or equal to the set intermittent operation prohibition vehicle speed, the internal combustion engine, the electric power-mechanical power input output assembly, and the motor so that the vehicle is driven with the driving power corresponding to the set driving power in the range defined by the set input and output limits of the accumulator with a continuous operation of the internal combustion engine. The 'control mode setting module' is not restricted to the arrangement of switching between the power mode and the ordinary mode or an arrangement of allowing the sequential gearshift position as one of gearshift positions but may be any other arrangement of setting at least one vehicle control mode of multiple vehicle control modes where output powers corresponding to driver's operation are different, for example, an arrangement of setting a fuel consumption priority mode or an arrangement of setting a constant speed drive mode. The 'generator' is not restricted to the motor MG1 constructed as a synchronous motor generator but may be any type of generator configured to input and output power, for example, an induction motor. The 'three shaft-type power input output structure' is not restricted to the power distribution integration mechanism 30 but may be any structure connected to three shafts, the driveshaft, the output shaft of the internal combustion engine, and a rotating shaft of the generator, and designed to input and output power to residual shaft based on powers input from and output to any two shafts among the three shafts, for example, a structure adopting a double pinion-type planetary gear mechanism, a structure connected to four or a greater number of shafts by combination of multiple planetary gear mechanisms, or a structure adopting a differential gear or another differential motion mechanism other than the planetary gear mechanism.

The above mapping of the primary elements in the embodiment and its modified examples to the primary constituents in the claims of the invention is not restrictive in any sense but is only illustrative for concretely describing the modes of carrying out the invention. Namely the embodiment and its modified examples discussed above are to be considered in all aspects as illustrative and not restrictive.

There may be many other modifications, changes, and alterations without departing from the scope or spirit of the main characteristics of the present invention.

INDUSTRIAL APPLICABILITY

The technique of the invention is preferably applied to the manufacturing industries of the vehicles.

The invention claimed is:

1. A vehicle, comprising:
an internal combustion engine;
an electric power-mechanical power input output assembly connected with a driveshaft linked to an axle of the vehicle and with an output shaft of the internal combustion engine in such a manner as to be rotatable independently of the driveshaft and configured to input and output power to and from the driveshaft and the output shaft through input and output of electric power and mechanical power;
a motor capable of outputting power to the driveshaft;
an accumulator configured to transmit electric power to and from the electric power-mechanical power input output assembly and the motor;
an input output limits setting module that sets input and output limits of the accumulator as maximum allowable electric powers to be charged in and discharged from the accumulator, according to a state of the accumulator;
an intermittent operation prohibition vehicle speed setting module that sets an intermittent operation prohibition vehicle speed for prohibiting an intermittent operation of the internal combustion engine, according to the set input limit of the accumulator;
a vehicle speed detector that detects a vehicle speed;
a driving power demand setting module that sets a driving power demand required for driving the vehicle; and
a controller configured to, when the detected vehicle speed is less than the set intermittent operation prohibition vehicle speed, control the internal combustion engine, the electric power-mechanical power input output assembly, and the motor so that the vehicle is driven with a driving power corresponding to the set driving power demand in a range defined by the set input and output limits of the accumulator with the intermittent operation of the internal combustion engine, when the detected vehicle speed is more than or equal to the set intermittent operation prohibition vehicle speed, the controller controlling the internal combustion engine, the electric power-mechanical power input output assembly, and the motor so that the vehicle is driven with the driving power corresponding to the set driving power in the range defined by the set input and output limits of the accumulator with a continuous operation of the internal combustion engine, and a control mode setting module that sets at least one vehicle control mode of multiple vehicle control modes where output powers corresponding to driver's operation are different, wherein the intermittent operation prohibition vehicle speed setting module sets the intermittent operation prohibition vehicle speed, according to the set vehicle control mode, and the controller controls the internal combustion engine, the electric power-mechanical power input output assembly, and the motor, according to the set vehicle control mode.

2. The vehicle in accordance with claim 1, wherein the intermittent operation prohibition vehicle speed setting module sets the intermittent operation prohibition vehicle speed having a tendency to be lower against severer limitation of the input limit of the accumulator.

3. The vehicle in accordance with claim 1, wherein the controller, when more than one vehicle control modes are set by the control mode setting module, specifies the smallest of the set intermittent operation prohibition vehicle speeds according to the set vehicle control modes as the intermittent operation prohibition vehicle speed.

4. The vehicle in accordance with claim 1, wherein the multiple vehicle control modes include an ordinary mode which enhances both fuel efficiency and responsiveness of output power and a power mode which gives higher priority to the responsiveness of output of power, the intermittent operation prohibition vehicle speed setting module, when the ordinary mode is set by the control mode setting module, sets the intermittent operation prohibition vehicle speed according to the input limit of the accumulator using a first relationship, when the power mode is set by the control mode setting module, the intermittent operation prohibition vehicle speed setting module setting the intermittent operation prohibition vehicle speed according to the input limit of the accumulator using a second relationship where the intermittent operation prohibition vehicle speed is defined to be greater than the one defined in the first relationship.

5. The vehicle in accordance with claim 1, wherein the multiple vehicle control modes include a sequential gearshift mode where braking force applied to the vehicle is changed according to driver's gearshift operation in a state of accelerator-off and brake-off, the intermittent operation prohibition vehicle speed setting module, when the sequential gearshift mode is set by the control mode setting module, sets the intermittent operation prohibition vehicle speed according to the driver's gearshift operation and the input limit of the accumulator.

6. The vehicle in accordance with claim 5, wherein the intermittent operation prohibition vehicle speed setting module, when the sequential gearshift mode is set by the control mode setting module, sets the intermittent operation prohibition vehicle speed having a tendency to be lower against greater braking force applied to the vehicle.

7. The vehicle in accordance with claim 5, wherein the intermittent operation prohibition vehicle speed setting module, when the sequential gearshift mode is set by the control mode setting module, sets the intermittent operation prohibition vehicle speed using multiple relationships that are different according to the driver's gearshift operation.

8. The vehicle in accordance with claim 1, the electric power-mechanical power input and output assembly includes:

a generator configured to input and output power; and a three shaft-type power input output structure connected to three shafts, the driveshaft, the output shaft of the internal combustion engine, and a rotating shaft of the generator, and designed to input and output power to residual shaft based on powers input from and output to any two shafts among the three shafts.

9. A control method of a vehicle, the vehicle including: an internal combustion engine; an electric power-mechanical power input output assembly connected with a driveshaft linked to an axle of the vehicle and with an output shaft of the internal combustion engine in such a manner as to be rotatable independently of the driveshaft and configured to input and output power to and from the driveshaft and the output shaft through input and output of electric power and mechanical power; a motor capable of outputting power to the driveshaft; an accumulator configured to transmit electric power to and from the electric power-mechanical power input output assembly and the motor, the control method, setting an intermittent operation prohibition vehicle speed for prohibiting an intermittent operation of the internal combustion engine according to an input limit of the accumulator, the input limit and an output limit of the accumulator settable according to a state of the accumulator as maximum allowable electric powers to be charged in and discharged from the accumulator, and controlling, when a vehicle speed is less than the set intermittent operation prohibition vehicle speed, the internal combustion engine, the electric power-mechanical power input output assembly, and the motor so that the vehicle is driven with a driving power corresponding to a driving power demand required for driving the vehicle in a range defined by the input and output limits of the accumulator with the intermittent operation of the internal combustion engine, while controlling, when the vehicle speed is more than or equal to the set intermittent operation prohibition vehicle speed, the internal combustion engine, the electric power-mechanical power input output assembly, and the motor so that the vehicle is driven with the driving power corresponding to the driving power in the range defined by the input and output limits of the accumulator with a continuous operation of the internal combustion engine, the control method further includes setting at least one vehicle control mode of multiple vehicle control modes where output powers corresponding to driver's operation are different, wherein the control method sets the intermittent operation prohibition vehicle speed, according to the set vehicle control mode, and the control method controls the internal combustion engine, the electric power-mechanical power input output assembly, and the motor, according to the set vehicle control mode.

* * * * *